United States Patent
Miller

(10) Patent No.: US 8,418,915 B1
(45) Date of Patent: Apr. 16, 2013

(54) METHOD AND SYSTEM FOR USING MACHINE-READABLE CODES TO MAINTAIN ENVIRONMENTAL IMPACT PREFERENCES

(75) Inventor: Kevin Miller, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 72 days.

(21) Appl. No.: 13/096,844

(22) Filed: Apr. 28, 2011

(51) Int. Cl.
*G06F 17/00* (2006.01)
*G06K 7/00* (2006.01)
*G06K 7/10* (2006.01)
*G06Q 30/00* (2012.01)

(52) U.S. Cl.
USPC ....... 235/375; 235/435; 235/462.01; 705/347

(58) Field of Classification Search .................. 235/375, 235/435, 462.01–462.49; 705/347
See application file for complete search history.

(56) References Cited

U.S. PATENT DOCUMENTS

| | | | |
|---|---|---|---|
| 4,977,595 | A | 12/1990 | Ohta et al. |
| 6,024,281 | A | 2/2000 | Shepley |
| 6,213,391 | B1 | 4/2001 | Lewis |
| 6,652,455 | B1 | 11/2003 | Kocher |
| 6,866,194 | B2 | 3/2005 | Scheurer |
| 7,308,429 | B1 | 12/2007 | Tozzi |
| 7,617,132 | B2 | 11/2009 | Reade et al. |
| 7,831,439 | B1 | 11/2010 | Bryar et al. |
| 7,999,674 | B2 | 8/2011 | Kamen |
| 2002/0027164 | A1 | 3/2002 | Mault et al. |
| 2002/0139846 | A1 | 10/2002 | Needham et al. |
| 2004/0060986 | A1 | 4/2004 | Bean et al. |
| 2004/0122771 | A1 | 6/2004 | Celi, Jr. et al. |
| 2004/0172281 | A1 | 9/2004 | Stanners |
| 2005/0137986 | A1 | 6/2005 | Kean |
| 2006/0065733 | A1* | 3/2006 | Lee et al. ................. 235/462.01 |
| 2007/0059672 | A1 | 3/2007 | Shaw |
| 2008/0059372 | A1 | 3/2008 | Lee et al. |
| 2008/0086387 | A1* | 4/2008 | O'Rourke et al. ............... 705/27 |
| 2008/0223928 | A1 | 9/2008 | Wagner et al. |
| 2009/0292617 | A1* | 11/2009 | Sperling et al. ................. 705/26 |

(Continued)

OTHER PUBLICATIONS

Kharif, Olga. "Apple Plans Services That Lets Iphone Users Pay With Handsets" (http://www.bloomberg.com/news/2011-01-25/apple-plans-service-that-lets-iphone-users-pay-with-handsets.html) dated Jan. 24, 2011 in three pages. Downloaded on Apr. 16, 2012.

(Continued)

*Primary Examiner* — Michael G Lee
*Assistant Examiner* — Laura Gudorf
(74) *Attorney, Agent, or Firm* — Knobbe, Martens, Olson & Bear LLP

(57) ABSTRACT

One embodiment of the present disclosure provides a system and associated processes for monitoring a customer's product purchases and product consumption. Further, the system enables the customer to maintain customer-selected preferences by presenting to the customer product information associated with the customer preferences and a product. In one embodiment, the system can monitor the consumption of products over a predefined period of time to facilitate the customer maintaining the customer preferences over the predefined period of time. In one embodiment, the system can present alternative product purchases based on a selected product and the customer preferences. In one embodiment, the system can facilitate monitoring nutrition consumption. In one embodiment, the system can facilitate monitoring pharmaceutical use. In one embodiment, the system can facilitate the customer making environmentally conscious purchases. In one embodiment, the system can present the customer with environmental offset options to help maintain customer environmental preferences.

39 Claims, 8 Drawing Sheets

U.S. PATENT DOCUMENTS

| | | | |
|---|---|---|---|
| 2009/0313145 A1* | 12/2009 | Hamilton et al. | 705/30 |
| 2010/0131343 A1* | 5/2010 | Hamilton et al. | 705/14.23 |
| 2010/0161345 A1 | 6/2010 | Cain et al. | |
| 2011/0139868 A1 | 6/2011 | Baker | |
| 2011/0186624 A1 | 8/2011 | Wagner et al. | |
| 2011/0264570 A1 | 10/2011 | Houseworth et al. | |
| 2011/0318717 A1 | 12/2011 | Adamowicz | |
| 2012/0005222 A1 | 1/2012 | Bhagwan et al. | |
| 2012/0054046 A1 | 3/2012 | Albisu | |
| 2012/0109762 A1 | 5/2012 | Getchius | |
| 2012/0254196 A1 | 10/2012 | Abramski et al. | |

OTHER PUBLICATIONS

Roger. "Starbucks Tests QR Code Payment" (http://2d-code.co.uk/starbucks-qr-code-payment/) dated Sep. 23, 2009 in four pages. Downloaded on Apr. 16, 2012.

U.S. Appl. No. 13/028,986, filed Feb. 16, 2011, Michal J. Geller et al.

* cited by examiner

METHOD AND SYSTEM FOR USING MACHINE-READABLE CODES TO MAINTAIN ENVIRONMENTAL IMPACT PREFERENCES

RELATED APPLICATIONS

This application is related to the following applications, the disclosures of which are incorporated in their entirety by reference herein:

| application Ser. No. | Filing Date | Title |
| --- | --- | --- |
| 13/096,812 | Apr. 28, 2011 | METHOD AND SYSTEM FOR USING MACHINE-READABLE CODES TO PERFORM A TRANSACTION |
| 13/096,863 | Apr. 28, 2011 | METHOD AND SYSTEM FOR PRODUCT RESTOCKING USING MACHINE-READABLE CODES |
| 13/096,897 | Apr. 28, 2011 | METHOD AND SYSTEM FOR USING MACHINE-READABLE CODES TO PERFORM TRANSACTIONS |
| 13/096,855 | Apr. 28, 2011 | METHOD AND SYSTEM FOR USING MACHINE-READABLE CODES TO TRACK CONSUMPTION |
| 13/096,804 | Apr. 28, 2011 | METHOD AND SYSTEM FOR USING MACHINE-READABLE CODES TO IDENTIFY PHARMACEUTICAL INTERACTIONS |

BACKGROUND

Machine-readable codes, such as barcodes and matrix barcodes, can be used to encode or represent data. These machine-readable codes can be read or scanned by specially designed optical scanners, i.e. barcode readers. Originally, machine-readable codes were limited in application due to the small amount of data that could be encoded. Further, the need for special optical scanners also limited the environments that could use machine-readable codes.

Today, technology has advanced such that machine-readable codes can be used to encode a much greater amount of information than the original linear barcodes. Further, it is now possible to use digital cameras to read barcodes. These digital cameras have become almost ubiquitous thanks in large part to the number of mobile phones that come equipped with cameras. Thus, the potential uses for machine-readable codes have also greatly increased.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF SPECIFIC EMBODIMENTS

Introduction

One embodiment of the present disclosure provides a system and associated processes for monitoring a customer's product purchases and product consumption. Further, the system enables the customer to maintain customer-selected preferences by presenting to the customer product information associated with the customer preferences and a product. In one embodiment, the system can monitor the consumption of products over a predefined period of time to facilitate the customer maintaining the customer preferences over the predefined period of time. Further, the system can present alternative product purchases based on a selected product and the customer preferences. In one embodiment, the system can facilitate monitoring nutrition consumption. Additionally, or alternatively, the system can facilitate monitoring pharmaceutical use. The system can also facilitate the customer making environmentally conscious purchases. Moreover, the system can present the customer with environmental offset options to help maintain customer environmental preferences.

Example Consumer Conscious Shopping Environment

Figure 1:
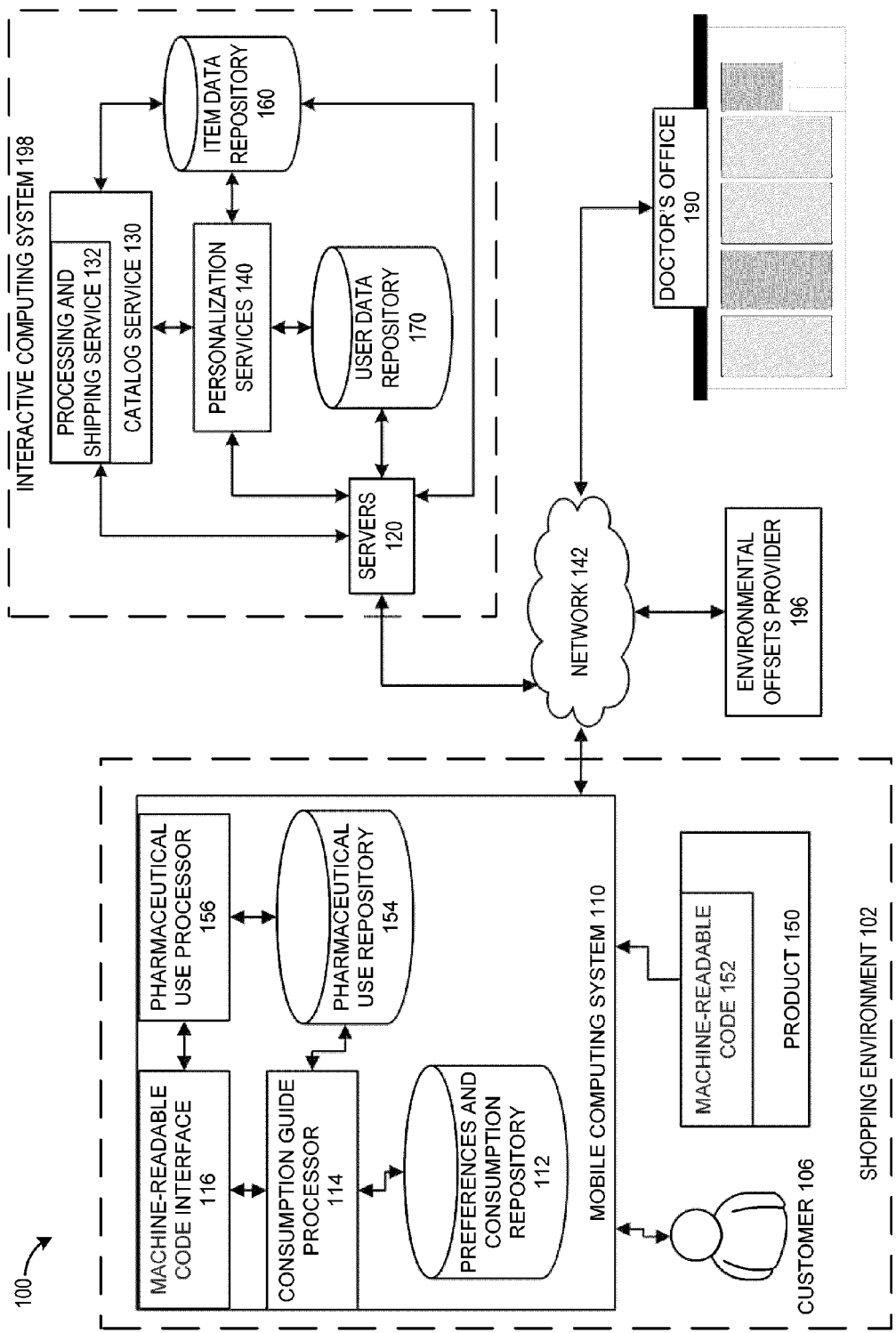
FIG. 1 illustrates an embodiment of a consumer conscious shopping environment that can use machine-readable codes to facilitate maintaining customer health and environmental preferences.

FIG. 1 illustrates an embodiment of a consumer conscious shopping environment 100 that can use machine-readable codes to facilitate maintaining customer health and environmental preferences. The machine-readable codes can include any type of code that can encode information including various linear barcodes and matrix or 2D barcodes. For example, the machine-readable code can be a Quick Response ("QR") code, a Datamatrix code, a High Capacity Color Barcode, a Shotcode, an Aztec Code, or a MaxiCode, to name a few.

The consumer conscious shopping environment 100 includes a shopping environment 102 that represents any provider of a product 150 or service. For example, the shopping environment 102 can be a clothing store, a grocery store, an electronics store, a pharmacy, a dry cleaner, or a car mechanic, to name a few. To simplify discussion, the rest of this disclosure will describe the shopping environment 102 as a product provider. Generally, the shopping environment 102 represents a brick-and-mortar store. However, in some embodiments, the shopping environment 102 can be an Internet-based store or ecommerce website. Further, in some embodiments, the shopping environment 102 can represent a product provider associated with both a brick-and-mortar store and an Internet-based store. In one embodiment, the shopping environment is a consumption environment. The consumption environment can include any environment where a customer 106 may consume or use a product 150. For example, the consumption environment can be the customer's 106 residence or workplace.

The product 150 can represent any type of product that the customer 106 is considering purchasing or consuming, or has already purchased or consumed. Further, the product 150 can be associated with one or more characteristics that the customer 106 is tracking, or that impacts the customer's 106 purchase or consumption decision. For example, if the customer 106 is tracking nutrition consumption, the product 150 can represent a food item. If the customer 106 is tracking pharmaceutical use, the product 150 can represent a pharmaceutical. Further, if the customer 106 is attempting to reduce his or her environmental footprint, the product 150 can represent any product that has an impact on the environment. For example, the product 150 can be an electronic device, a food item, a pharmaceutical, a cleaning product, a clothing item, or a vehicle, to name a few.

In one embodiment, the product 150 is associated with a machine-readable code 152. For example, the machine-readable code can be affixed to the product's 150 packaging via a sticker, printed directly onto the product's 150 packaging, included on a shipping label, etched directly onto the product 150, combinations of the same, or the like. The machine-readable code 152 can comprise any information associated with product characteristics and/or use information. For example, if the product 150 represents a food item, the machine-readable code 152 can include nutrition information. This nutrition information can include any information associated with food, such as ingredients, nutrition facts or statistics (e.g. calorie count, % of daily vitamins, amount of fat, amount of saturated fat, amount of sugar etc.), organic status, product origin, origin of ingredients, allergy-related information, pasteurization status, or any nutrition information on a Nutrition Facts label or the like, to name a few.

As a second example, if the product 150 represents a pharmaceutical, the machine-readable code 152 can comprise pharmaceutical information. This pharmaceutical information can include any information associated with taking a pharmaceutical, such as ingredients, active ingredients, allergy information, potential side effects, potential drug-interaction information, dosage instructions, recommended body state at time of use (e.g. on an empty stomach, with food, with water, an hour before bed, etc.), usage warnings (e.g. may cause drowsiness, not for pregnant women, not suitable for children, etc.), or government approval information, to name a few.

In one embodiment, the machine-readable code 152 can comprise any environmental impact information associated with the product 150. This environmental impact information can relate to the manufacture, use, shipping or disposal of the product 150. Further, the environmental impact information can include, for example, identification of a type, amount, or percentage of one or more of reusable materials, biodegradable materials, toxic materials, limited-resource materials, or renewable materials, to name a few. In addition, the environmental impact information can include identification of the impact of one or more processes used in manufacturing or shipping the product 150, as well as one or more processes involved in using the product 150 that may have an impact on the environment. Further, the environmental impact information can include the amount of pollutants and/or the amount of carbon-dioxide ($CO_2$) created or released in the manufacture, shipping, disposal, or use of the product 150.

In one embodiment, the machine-readable code 152 can also include a price and product identity information (e.g. type of product or brand of product) associated with the product 150. The machine-readable code 152 can also include a Uniform Resource Locator (URL) or Uniform Resource Identifier (URI). This URL or URI can point the mobile computing device 110, or any other system that accesses the machine-readable code 152, to a source that includes information (e.g. nutrition information or environmental impact information) associated with the product 150.

In one embodiment, the machine-readable code 152 can be a watermark. This watermark can be visible, invisible, or less visible than other markings on the product 150. One example of a watermark that may be incorporated in the machine-readable code is the Digimarc® watermark from Digimarc Corporation of Beaverton, Oreg.

In one embodiment, the machine-readable code 152, although not limited as such, can be used to help the customer 106 maintain purchase preferences, track product purchase and consumption, and monitor the customer's 106 health. Several non-limiting example scenarios will now be described with respect to FIG. 1.

Example Use Scenario—Food Purchase or Consumption

In one example use scenario, the product 150 can be a food item. In this example scenario, when the customer 106 is considering purchasing or consuming the product 150, the customer 106 can access or scan the machine-readable code 152 using a machine-readable code interface 116 associated with a mobile computing system 110. A consumption guide processor 114 associated with the mobile computing system 110 can extract nutrition information from the machine-readable code 152. Upon extracting the nutrition information, the mobile computing system 110 can present the nutrition information to the customer 106 thereby enabling the customer 106 to decide, based on the nutrition information, whether to purchase or consume the food item.

In one embodiment, the consumption guide processor 114 can access customer nutrition preferences stored at a preferences and consumption repository 112. The customer 106 can enter or change the nutrition preferences using a user interface provided by the consumption guide processor 114. The customer nutrition preferences can include any nutrition-related preferences. For example, the customer nutrition preferences can include a preference to purchase or consume organic food, locally grown food, all-natural food, low-fat food (e.g. food with a fat content below a predefined threshold), food with less than a predefined threshold of sugar, and vegan food, to name a few. Further, the customer nutrition preferences can differ based on the food type. For example, a customer preference associated with fat may differ for meat versus cakes, or for beef versus chicken. In one embodiment, one or more of the customer nutrition preferences can be aspirational guidelines. Alternatively, one or more of the customer nutrition preferences can be absolute rules. For example, if the customer 106 is allergic to peanuts, the customer nutrition preferences can specify no peanuts and/or no food made in a facility that also manufactures food with peanuts. As a second example, if the customer 106 is vegetarian, the customer nutrition preferences can specify that all products must include no meat or meat-based ingredients.

Using the customer nutrition preferences and the nutrition information, the consumption guide processor 114 can cause the mobile computing system 110 to present to the customer 106 a recommendation of whether to purchase or consume the product 150.

In one embodiment, the consumption guide processor 114 can cause the mobile computing system 110 to present an alternative product suggestion to the customer 106 based, at least in part, on the customer nutrition preferences and the nutrition information. In one embodiment, the alternative product suggestion is generated by an interactive computing system 198, which provides the alternative product suggestion to the mobile computing system 110. In one embodiment, the mobile computing system 110 can communicate with the interactive computing system 198 via the network 142. In one embodiment, the alternative product suggestion is based, at least in part, on the price, type of product, and/or product ratings of the product 150 and the potential alternative products.

In one embodiment, the scope of the potential alternative product suggestions vary based on the product 150. For example, if the product 150 is cereal, the alternative product suggestion may include different types of cereal. If the product 150 is cookies, the alternative product suggestion may include other cookies, and may include other food items classified as desserts, such as cakes and ice-cream, or other food classified as snacks, such as potato chips, pretzels, and dried fruit. In one embodiment, the customer 106 can select the scope of alternative product suggestions. In one embodiment, the food classifications can be pre-defined by one or more of the following: the customer 106; the interactive computing system 198; an organization associated with the interactive computing system 198; and a governmental organization, such as the Food and Drug Administration or the Department of Agriculture. Alternatively, the food classifications can be determined based on any algorithm that can recommend an alternative product based on what other consumers are viewing and purchasing. For example, the algorithm can involve identifying a set of shared attributes common to all items viewed by a consumer before selecting a product for purchase. Any item that includes the same set of shared attributed can then be classified similarly. These attributes are described further with respect to FIG. 3.

In one embodiment, the consumption guide processor 114 can cause the mobile computing system 110 to present an alternative product source suggestion to the customer 106. The alternative product source suggestion can be identified by the interactive computing system 198, which provides the suggestion to the mobile computing system 110.

Further, the consumption guide processor 114 can track total product purchases or consumption over a predefined time period or event. In addition, the consumption guide processor 114 can provide warnings and/or recommendations related to purchasing or consuming the product 150 based on the tracked total product purchases or consumption, the customer nutrition preferences, and the nutrition information associated with the product 150.

Example Use Scenario—Pharmaceutical Purchase or Consumption

In another example use scenario, the product 150 can be a pharmaceutical. In this example scenario, when the customer 106 is considering purchasing the product 150, the customer 106 can access or scan the machine-readable code 152 using the machine-readable code interface 116. A pharmaceutical use processor 156 associated with the mobile computing system 110 can extract pharmaceutical information from the machine-readable code 152. Upon extracting the pharmaceutical information, the mobile computing system 110 can present the translated pharmaceutical information to the customer 106 thereby enabling the customer 106 to decide, based on the pharmaceutical information, whether to purchase the pharmaceutical.

The pharmaceutical use processor 156 can access a pharmaceutical use repository 154 to identify one or more pharmaceuticals the customer 106 is currently taking. The pharmaceutical use processor 156 can determine if any known interactions exist between the product 150 and the one or more pharmaceuticals the customer 106 is currently taking. This determination can be based, at least in part, on the pharmaceutical information extracted from the machine-readable code 152 and the pharmaceutical information associated with the one or more pharmaceuticals, which can be stored at the pharmaceutical use repository 154, accessed from the interactive computing system 198, or from any other pharmaceutical information resource. If any potential drug interactions are identified, the pharmaceutical use processor 156 can cause the mobile computing system 110 to present a warning to the customer 106.

The pharmaceutical use processor 156 can also cause the mobile computing system 110 to present an alternative pharmaceutical suggestion to the customer 106 based, at least in part, on the pharmaceutical information. In one embodiment, the alternative pharmaceutical suggestion is generated by an interactive computing system 198, which provides the alternative pharmaceutical suggestion to the mobile computing system 110. In one embodiment, the alternative pharmaceutical suggestion is based, at least in part, on the price, brand, and/or product ratings of the product 150 and the potential alternative pharmaceuticals. In one embodiment, the alternative pharmaceutical suggestion is based, at least in part, on any pharmaceuticals the customer 106 is currently taking and any potential drug interactions associated with these pharmaceuticals and the potential alternative pharmaceuticals.

Additionally, the pharmaceutical use processor 156 can verify the suitability of the alternative pharmaceutical as a substitute for the product 150 by providing pharmaceutical information associated with the alternative pharmaceutical to a doctor's office 190. In one embodiment, the pharmaceutical use processor 156 can obtain pre-approval for purchasing the alternative pharmaceutical from the customer's 106 health insurance company (not shown) by providing pharmaceutical information associated with the alternative pharmaceutical to the insurance company.

Further, the pharmaceutical use processor 156 can cause the mobile computing system 110 to present an alternative pharmaceutical source suggestion to the customer 106. In one embodiment, the alternative pharmaceutical source suggestion is identified by the interactive computing system 198, which provides the suggestion to the mobile computing system 110.

The pharmaceutical use processor 156 can also facilitate the customer 106 taking the product 150 under a recommended or prescribed body state or condition and at the recommended or prescribed dose taking time. The pharmaceutical use processor 156 can determine both when the customer 106 should take a dose of the product 150 and under what body state based on the pharmaceutical information extracted from the machine-readable code 152. When it is time to take a dose of the pharmaceutical, the pharmaceutical use processor 156 can cause the mobile computing system 110 to alert the customer 106 and to provide dose usage instructions based on the pharmaceutical information. In some embodiments, the pharmaceutical use processor 156 can cause the mobile computing system 110 to alert the customer 106 prior to the dose taking time of the prescribed body state. For example, the pharmaceutical use processor 156 can alert the customer 106 30-minutes before the dose taking time that the dose should be taken on a full stomach thereby enabling the customer 106 to eat before it is time to take the dose of the product 150. These alerts can take any form and can be auditory, visual, tactile or a combination thereof. For example, an alert can be a beep, a musical chime, an email, a vibration alert, or a text message, to name a few.

Moreover, in some embodiments, the pharmaceutical use processor 156 keeps track of the number of doses remaining of the product 150. This enables the pharmaceutical use processor 156 to alert the customer 106 to refill the customer's 106 pharmaceutical supply prior to exhausting the customer's 106 pharmaceutical supply.

Example Use Scenario—Environmentally Conscious Purchases

In yet another example use scenario, the product 150 can be any product that has an impact on the environment. In this example scenario, when the customer 106 is considering purchasing the product 150, the customer 106 can access or scan the machine-readable code 152 using the machine-readable code interface 116. A consumption guide processor 114 associated with the mobile computing system 110 can extract environmental impact information from the machine-readable code 152. Upon extracting the environmental impact information, the mobile computing system 110 can present the translated environmental impact information to the customer 106 thereby enabling the customer 106 to decide, based on the environmental impact information, whether to purchase the product 150.

In one embodiment, the consumption guide processor 114 can access customer environmental impact preferences stored at a preferences and consumption repository 112. The customer environmental impact preferences can include any preference relating to the environmental impact of a product, including, for example, the impact of manufacturing, shipping, using, or disposing of the product. For example, the customer environmental impact preferences can specify that the manufacture of the product 150 use less than a predefined threshold of non-renewable energy or materials. As a second example, the customer environmental impact preferences can specify that products be recyclable. In one embodiment, the customer environmental impact preferences are associated with product categories. For example, the customer environmental impact preferences can specify that: food items be locally grown; electronics contain no toxic materials and use less than a pre-defined threshold of electricity to manufacture and to operate; packaging materials be biodegradable; and that furniture be made using new-growth wood, non-toxic glue, and lead-free paint, to name a few. In one embodiment, the customer environmental impact preferences are aspirational. Alternatively, the customer environmental impact preferences are firm rules. For example, the customer 106 may insist on absolutely no mercury in products.

Using the customer environmental impact preferences and the environmental impact information, the consumption guide processor 114 can cause the mobile computing system 110 to present to the customer 106 a recommendation of whether to purchase the product 150.

In one embodiment, the consumption guide processor 114 can cause the mobile computing system 110 to present an alternative product suggestion to the customer 106 based, at least in part, on the customer environmental impact preferences and the environmental impact information. In one embodiment, the alternative product suggestion is generated by the interactive computing system 198, which provides the alternative product suggestion to the mobile computing system 110. Further, the alternative product suggestion can be based, at least in part, on the price, features, and product ratings of the product 150 and the potential alternative products.

In one embodiment, the consumption guide processor 114 can cause the mobile computing system 110 to present an alternative product source suggestion to the customer 106. The alternative product source suggestion, in some embodiments, can be identified by the interactive computing system 198, which provides the suggestion to the mobile computing system 110.

The consumption guide processor 114 can cause the mobile computing system 110 to present one or more environmental impact offset options to the customer 106. The environmental impact offset options can include any option for offsetting the environmental impact or footprint of manufacturing, shipping, using, or disposing of the product 150. For example, the environmental impact offset options can include purchasing carbon credits or offsets, paying for the planting of new trees, donating money to alternative energy research, or helping to purchase environmentally friendly replacement products for people who can not afford to do so themselves, to name a few.

In one embodiment, the one or more suggested environmental impact offset options can be identified by the interactive computing system 198, which provides the suggestions to the mobile computing system 110. Further, the environmental offsets provider 196 can provide one or more of the environmental impact offset options.

The alternative product suggestions can include one or more suggested environmental impact offset options. Advantageously, in some embodiments, the customer 106 may be able to combine an alternative purchase with an environmental impact offset option to satisfy the customer's 106 environmental impact preferences. Although not limited as such, the ability to suggest purchasing an alternative product along with an environmental impact offset option facilitates the customer 106 satisfying environmental impact preferences when no product may exist that can alone satisfy the customer's 106 environmental impact preferences.

Terminology

In one embodiment, the customer 106 is associated with a mobile computing system 110. The mobile computing system 110 can generally include any mobile computing device, such as cellular phones, smart phones, PDAs, tablets, portable video game devices, and portable music players, to name a few. Further, the mobile computing system 110 can include a machine-readable code interface 116, a consumption guide processor 114, a pharmaceutical use processor 156, a preferences and consumption repository 112, and a pharmaceutical use repository 154. Moreover, the mobile computing system 110 may include one of the consumption guide processor 112 and the pharmaceutical use processor 156, or both.

The machine-readable code interface 116 can generally include any system configured to read or scan a machine-readable code 152. For example, the machine-readable code interface 116 can include a barcode scanner, a camera, or an optical reader, to name a few.

The consumption guide processor 114 can generally include any system that can translate information associated with the machine-readable code 152 into a human-readable form and cause the human-readable information to be presented to the customer 106. Further, the consumption guide processor 114 can include any system that can access customer preferences, determine whether a product 150 satisfies the customer preferences, and present a recommendation to the customer 106 based, at least in part, on the customer preferences and the information associated with the machine-readable code 152. For example, the consumption guide processor 114 can be used to help with one or more of the following: monitor nutrition information, maintain customer nutrition preferences, or maintain environmental impact preferences.

The pharmaceutical use processor 156 can generally include any system that can track pharmaceutical use and can provide reminder notifications to the customer 106. These reminder notifications can relate to one or more of: when to take a pharmaceutical, under what condition to take the pharmaceutical, any side effects of the pharmaceutical, when to replenish a supply of the pharmaceutical, and any other pharmaceutical-relation reminders. In one embodiment, the pharmaceutical use processor 156 can include some or all of the functionality of the consumption guide processor 114. Thus, for example, the pharmaceutical use processor 156 can translate information associated with the machine-readable code 152 into a human-readable form and cause the human-readable information to be presented to the customer 106.

The preferences and consumption repository 112 can generally include any repository, database, or information storage system that can store information associated with the customer's 106 preferences, such as nutrition preferences or environmental impact preferences. Further, the preferences and consumption repository 112 can store any consumption tracking information, such as nutrition intake information.

The pharmaceutical use repository 154 can generally include any repository, database, or information storage system that can store information associated with the customer's 106 pharmaceutical use. This can include information associated with taking a particular pharmaceutical as well as information associated with each pharmaceutical the customer 106 may be taking. In one embodiment, the pharmaceutical use repository 154 and the preferences and consumption repository 112 can be a single repository.

The network 142 can include any type of wired or wireless network including a combination of wired and wireless networks. For example, the network 142 can be a LAN, WAN, a cellular network, or the Internet, to name a few. In one embodiment, the network 142 enables the mobile computing system 110 to communicate with one or more of the environmental offsets provider 196, the doctor's office 190, and the interactive computing system 198.

The environmental offsets provider 196 can generally include any organization or party that can provide a program or service to facilitate reducing or offsetting the environmental impact of an item or process. For example, the environmental offsets provider 196 can include a government or private organization that sells carbon offsets or credits. As a second example, the environmental offsets provider 196 can include organizations that research or fund research relating to alternative energy sources or other potential pollution reducing technologies. As another example, the environmental offsets provider 196 can include organizations that plant trees, or purchase and/or maintain endangered habitats, such as rainforests. In one embodiment, the customer 106 can purchase the offset directly from the environmental offsets provider 196 or can purchase the offset via a third-party, such as an organization associated with the interactive computing system 198.

The doctor's office 190 can generally include any healthcare provider that is capable of prescribing a pharmaceutical or providing medical advice relating to pharmaceuticals.

The interactive computing system 198 can generally represent any ecommerce system that can provide products, services, and purchase recommendations based on any number of criteria. This criteria can include, for example: the customer 106's preferences, prior purchases, product views, or product ratings; and other customers' preferences, purchases, product views, or product ratings, to name a few. In one embodiment, the interactive computing system 198 is associated with a brick-and-mortar store, an ecommerce organization, or both.

The interactive computing system 198 can be implemented with one or more physical servers or computing machines. Thus, each of the components depicted in the interactive computing system 198 can include hardware and/or software for performing various features. In one embodiment, the interactive computing system 198 is a web site or collection of web sites.

In the depicted embodiment, the interactive computing system 110 includes several components that can be implemented in hardware and/or software. For instance, the interactive computing system 110 includes one or more physical servers 120 for sending, receiving, and responding to network requests from, for example, the mobile computing system 110. The one or more servers 120 can include web servers, application servers, database servers, combinations of the same, or the like. The interactive computing system 110 also includes a catalog service 130 and associated search engine (not shown) in communication with the one or more servers 120. Users (e.g. the customer 106) can browse an electronic catalog provided by the catalog service 130 or query the search engine to obtain information about electronic catalog content stored in an item data repository 160. In one embodiment, the consumption guide processor 114 and/or the pharmaceutical use processor 156 can browse the electronic catalog or query the search engine to obtain information about the electronic catalog content.

The electronic catalog content can include information about products and/or services. In one embodiment, this content is arranged in a hierarchical structure, having items associated with one or more categories or browse nodes in a hierarchy. The catalog service 130 can provide functionality for users to browse the item hierarchy in addition to searching the catalog. Users can select an item represented in the hierarchy or in a list of search results to see more details about an item. In response to a user item selection, the server 120 can provide to a user system (e.g. the mobile computing system 110) a catalog page (sometimes called an item detail page) that includes details about the selected item. In one embodiment, the server 120 can provide the catalog page in response to a request from the consumption guide processor 114 and/or the pharmaceutical use processor 156.

The catalog service 130 can include a processing and shipping service 132. The processing and shipping service 132 can perform any processes associated with initiating and/or completing a transaction associated with the customer 106. For example, the processing and shipping service 132 can obtain billing and shipping information associated with a customer 106. To initiate and/or complete the transaction, the processing and shipping service 132 can communicate with one or more of the following: the mobile computing system 110, the consumption guide processor 112, and the pharmaceutical use processor 156. Further, the processing and shipping service 132 can perform any processes associated with providing a product to the customer 106. For example, the processing and shipping service 132 can initiate shipping the product to the customer 106 via a third-party shipping service provider (not shown).

The personalization services 140 can include services for providing personalized information to users. Examples of personalization services 140 include recommendation services, personalized search services, and tag-based services. A recommendation service can use any of a variety of algorithms for generating recommendations, including behavior-based algorithms. In some embodiments, such behavior-based algorithms can analyze user behavior to generate item-to-item mappings and can use these mappings to recommend items related to a user's item selection activities. Examples of recommendation algorithms that can be used herein are described in U.S. Publication No. 2002/0198882, filed Jan. 14, 2002, titled "Content Personalization Based on Actions Performed During a Current Browsing Session," the disclosure of which is hereby incorporated by reference in its entirety. Personalized search services can recommend search queries to users, in some implementations. Tag-based services can provide functionality for users to apply textual tags to items in the catalog to thereby categorize the items. Other personalization services can include list services, where users create lists of items, blogging services, personalized social networking services, and the like.

In one embodiment, the consumption guide processor 114 and/or the pharmaceutical use processor 156 can use the personalization services 140 to obtain recommendations of suggested alternatives to the product 150 based, at least in part, on the information associated with the machine-readable code 152 and any customer preferences stored in the preferences and consumption repository 112. In one embodiment, the customer preferences can be stored at and accessed from the user data repository 170.

The user data repository 170 can include any information associated with the customer 106 that can facilitate making recommendations. Further, the user data repository 170 can include any information associated with the customer 106 that can facilitate purchasing a suggested alternative product, environmental offsets, or the product 150 from an alternative source, including an organization associated with the interactive computing system 198. For example, this information can include billing and shipping information.

In one embodiment, the consumption guide processor 114 (or the pharmaceutical use processor 156) can facilitate the purchase of the product 150, a refill of a pharmaceutical prescription, an environmental offset, or an alternative product from an alternative source (e.g. interactive computing system 198). Upon presenting the customer 106 with a purchase option, the consumption guide processor 114 can receive an indication from the customer 106 of the customer's 106 desire to proceed with the purchase option transaction. The consumption guide processor 114 can then initiate the transaction. In one embodiment, initiating the transaction can comprise providing shipping and billing information to the product source. Alternatively, the shipping and billing information can be stored in the user data repository 170. Thus, in some embodiments, upon receiving an acceptance of the proposed transaction from the customer 106, no further input is required from the customer 106.

Example Process for Accessing Nutrition Information

Figure 2:
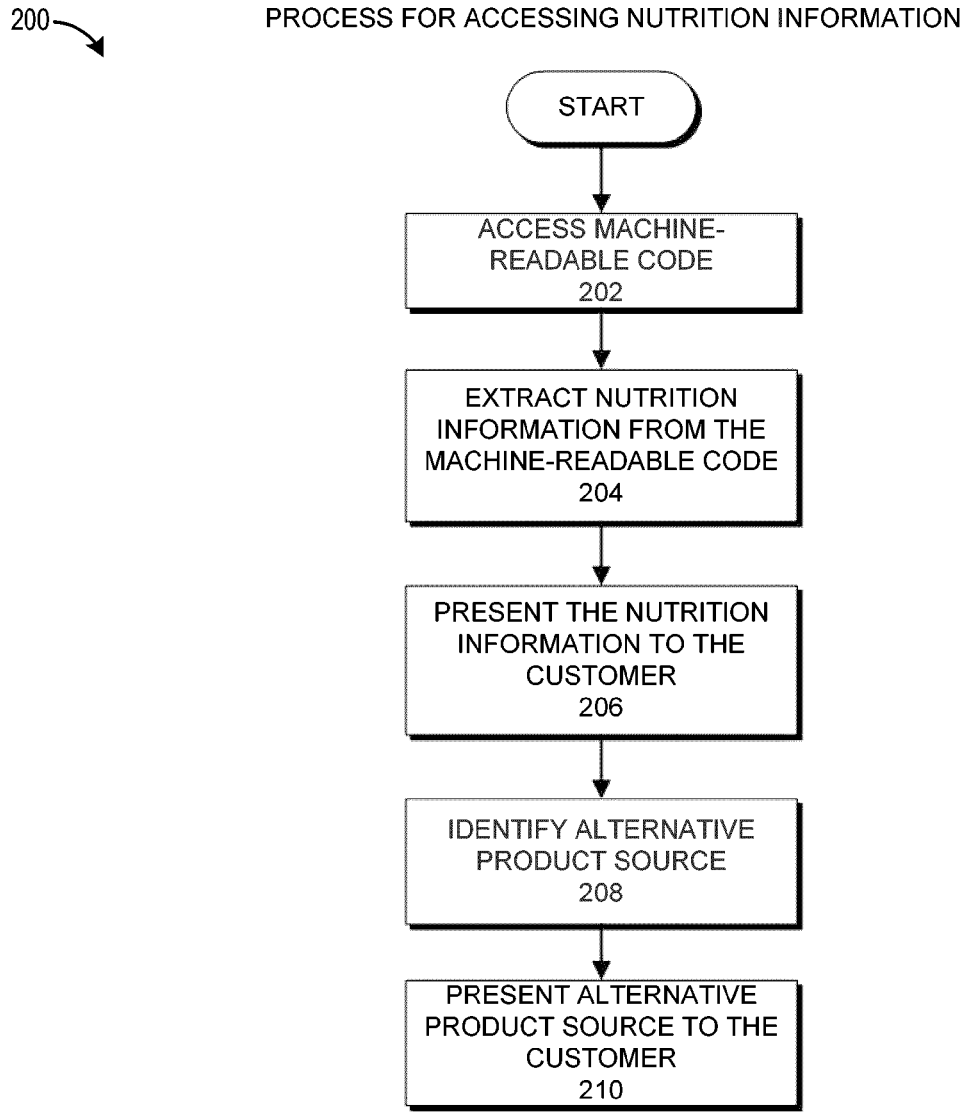
FIG. 2 illustrates a flow diagram for one embodiment of a process for accessing nutrition information.

FIG. 2 illustrates a flow diagram for one embodiment of a process 200 for accessing nutrition information. The process 200 can be implemented by any system that can extract nutrition information from, at least in part, a machine-readable code 152 and present it to a customer 106. For example, the process 200, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 200, to simplify discussion, the process 200 will be described as being generally implemented by the consumption guide processor 114. In one embodiment, the machine-readable code 152 is associated with the product 150, which can represent any type of food item.

The process 200 begins at block 202, where, for example, the consumption guide processor 114 accesses the machine-readable code 152 associated with a food product 150. At block 204, the consumption guide processor 114 extracts nutrition information from the machine-readable code 152. This nutrition information can include any information associated with food as described above with respect to FIG. 1. In one embodiment, the consumption guide processor 114 can optionally supplement the nutrition information with information obtained from sources alternative to the machine-readable code 152, such as the interactive computing system 198, a source associated with the product's 150 manufacturer, or a government database.

At block 206, the consumption guide processor 114 causes the nutrition information to be presented to the customer 106. In one embodiment, block 206 can further comprise translating the nutrition information from a machine-readable format into a human-readable format and presenting the human-readable format to the customer 106.

In one embodiment, block 206 can further comprise converting one or more pieces of complex nutrition information into a simpler form, such as converting the scientific name of an ingredient, to a layman's term and/or identifying the purpose of the ingredient (e.g. a preservative or a food coloring). For example, if the product 150 includes ascorbic acid, the consumption guide processor 114 can convert the term "ascorbic acid" to "vitamin C" and indicate that it may be added as an antioxidant, a nutrient, or to maintain the product's 150 color.

In one embodiment, block 206 can further comprise presenting an analysis of the product 150 with respect to consumer nutrition preferences. This process is described in more detail with respect to FIG. 3.

At block 208, the consumption guide processor 114 can identify an alternative product source for purchasing or obtaining the product 150. In one embodiment, identifying the alternative product source may comprise providing the identity of the product 150 to the interactive computing system 198, which can then provide the mobile computing system 110 with an alternative source for the product 150. In one embodiment, the interactive computing system 198 can serve as the alternative product source. Further, the alternative product source can be an ecommerce site or a brick-and-mortar store. In addition, identifying an alternative product source can include identifying an alternative product source that sells product 150 for a different price than the shopping environment 102 sells the product 150. Moreover, the consumption-guide processor 114 can identify the alternative product source from one or more product sources that sells the product 150 and/or the alternative product at the lowest price.

At block 210, the consumption guide processor 114 can cause the alternative product source to be presented to the customer 106. In one embodiment, the customer 106 can initiate a transaction with the alternative product source by accepting a purchase offer presented by the consumption guide processor 114 at block 210. In one embodiment, any of blocks 206, 208, and 210 can be optional, among others.

Example Nutrition Preference Maintenance Process

Figure 3:
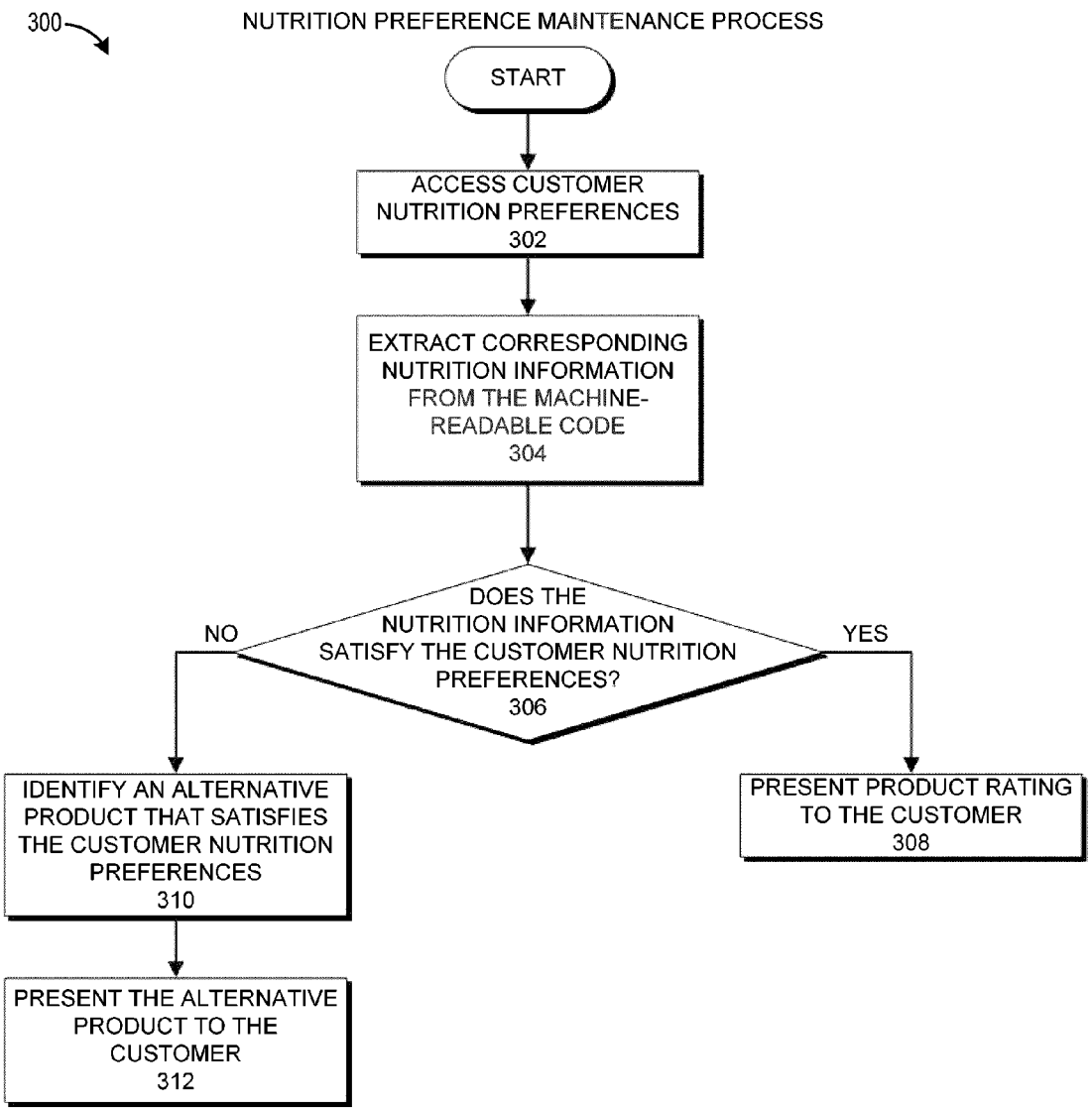
FIG. 3 illustrates a flow diagram for one embodiment of a nutrition preference maintenance process.

FIG. 3 illustrates a flow diagram for one embodiment of a nutrition preference maintenance process 300. The process 300 can be implemented by any system that can access customer nutrition preferences and determine if a product 150 satisfies the customer nutrition preferences. For example, the process 300, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 300, to simplify discussion, the process 300 will be described as being generally implemented by the consumption guide processor 114.

The process 300 begins at block 302, where, for example, the consumption guide processor 114 accesses customer nutrition preferences associated with the customer 106 and stored at, for example, the preferences and consumption repository 112. The customer nutrition preferences can include any preferences related to the customer's 106 purchase and/or consumption of food products as described above with respect to FIG. 1. In one embodiment, the customer nutrition preferences can include temporary preferences. For example, a preference not to purchase or consume meat-based products for a predefined time due to religious reasons, or a preference not to purchase or consume spinach from a particular geographic region for a predefined time due to uncertainty about e-coli findings. Further, the customer nutrition preferences can be associated with another user or person. For example, the customer nutrition preferences may be associated with the customer's 106 child. In addition, the customer nutrition preferences can be associated with multiple users or people. For example, the customer nutrition preferences may be associated with the customer's 106 household or immediate family.

In one embodiment, the customer nutrition preferences are pre-specified by the customer 106. Alternatively, or additionally, the customer nutrition preferences can be pre-specified by a healthcare provider. In one embodiment, the customer nutrition preferences can be based on a diet program selected by the customer 106 or a nutritionist.

At block 304, the consumption guide processor 114 can extract nutrition information from the machine-readable code 152 corresponding to the customer nutrition preferences. In one embodiment, the consumption guide processor 114 supplements the nutrition information as described with respect to block 204.

At decision block 306, the consumption guide processor 114 determines if the nutrition information satisfies the customer nutrition preferences. In one embodiment, the determination can be per preference category. For example, the consumption guide processor 114 can determine if the amount of fat, sugar, or vitamin D exceeds a threshold. In one embodiment, the determination can be made as a whole based on predefined rules. For example, the customer 106 may specify as part of the customer preferences a desire to not purchase products with sugar content above a threshold. However, the customer 106 may further specify that a product with sugar content above the threshold may still be desirable if the product contains more than a threshold level of a number of pre-specified vitamins.

If at decision block 306 the consumption guide processor 114 determines that the nutrition information satisfies the customer preferences, the consumption guide processor 114 can present to the customer 106 a product rating or other indication at block 308. This product rating or indication can reflect how well the nutrition information of the product matches the customer's nutrition preferences. This product rating can include any indication and/or information related to the product's 150 satisfaction of the customer nutrition preferences. For example, the product rating can be a thumbs up, a green checkmark, or a star-based rating or the like (e.g., a four or five star rating system). Further, presenting the product rating can include presenting to the customer 106 an absolute or percentage-based comparison of the nutrition information to the customer nutrition preferences. In addition, presenting the product rating can include playing a sound associated with the product rating (e.g. a chime for a product that matches the customer nutrition preferences and a beep for a product that does not match the customer nutrition preferences). In one embodiment, block 308 is optional.

If at decision block 306 the consumption guide processor 114 determines that the nutrition information does not satisfy the customer preferences, the consumption guide processor 114 can identify an alternative product that does satisfy the customer nutrition preferences. In one embodiment, the alternative product is determined based on one or more of the identity of the product 150, the nutrition information, and the customer nutrition preferences. In one embodiment, the consumption guide processor 114 can determine the alternative product based on information stored at the preferences and consumption repository 112. Alternatively, the consumption guide processor 114 can provide the identity of the product 150 and the customer nutrition preferences to the interactive computing system 198, which can then provide the alternative product suggestion to the consumption guide processor 114.

In one embodiment, the alternative product may not satisfy the customer nutrition preferences, but may be closer to satisfying the customer nutrition preferences than the product 150 is to satisfying the customer nutrition preferences. In one embodiment, the alternative product may be a version of the product 150 offered by a competing manufacturer or producer of the product 150 (e.g. the product 150 and the alternative product may both be frozen pizzas, or cartons of orange juice). In one embodiment, the alternative product may be in the same or a related category as the product 150, but not necessarily a version of the product 150. For example, both products may be two different kinds of fruit (e.g. apples and oranges) or two different types of snacks (e.g. pretzels and potato chips).

In one embodiment, identifying an alternative product can include identifying one or more products that share one or more attributes with the product 150. For example, the consumption guide processor 114 can identify one or more characteristics or attributes associated with the product 150. Based in part on the one or more attributes, the consumption guide processor 114 can identify alternative products that share a certain number or percentage of attributes with the product 150. The consumption guide processor 114 can rank the alternative products based, at least in part, on the number or percentage of attributes the alternative products share with the product 150. Further, the ranking can be based, at least in part, on how closely the alternative products satisfy the customer nutrition preferences. A certain number of the alternative products can be presented to the customer 106 based on the ranking of the alternative products.

Product attributes can include any characteristics that can be used to relate two products. For example, the attributes can include ingredients, nutrition content, or food type (e.g. fruit, meat, vegetable, snack, dessert, etc.), to name a few. In one embodiment, the interactive computing system 198 determines the alternative products based on attributes associated with the product 150. The consumption guide processor 114 can provide the attributes to the interactive computing system 198, or the interactive computing system 198 can determines the attributes based on the identity of the product 150.

At block 312, the consumption guide processor 114 can present the alternative product to the customer 106. This can include presenting a product rating based on nutrition information associated with the alternative product and the customer nutrition preferences to the customer 106. Further, presenting the alternative product can also comprise presenting the product rating associated with the product 150. These product ratings can show absolute and/or percentile differences between the nutrition information and the customer nutrition preferences. Further, these product ratings can use any visual or audio indicators that can facilitate the customer 106 quickly discerning the product ratings. For example, a red 'X' to indicate that the product 150 does not satisfy the customer nutrition preferences, and a yellow flashing circle to indicate, for example, that the alternative product may satisfy all but one customer preference, or minimally satisfies the customer nutrition preferences. Further, the visual cue can include, for example, a flashing nut to indicate an allergy warning.

In one embodiment, blocks 310 and 312 are optional. In one embodiment, the consumption guide processor 114 presents the customer 106 with an indication of whether the product 150 satisfies the customer nutrition information. This indication may be either positive (e.g. a solid green circle) or a negative indication (e.g. an audio beep or a red 'X').

Further, the consumption guide processor 114 can present a purchase offer associated with purchasing the product 150 or the alternative product from the interactive computing system 198. The customer 106 can indicate acceptance of this offer by, for example, pressing a button, rescanning a machine-readable code, voicing an acceptance, or any other acceptance process.

Example Consumption Monitoring Process

Figure 4:
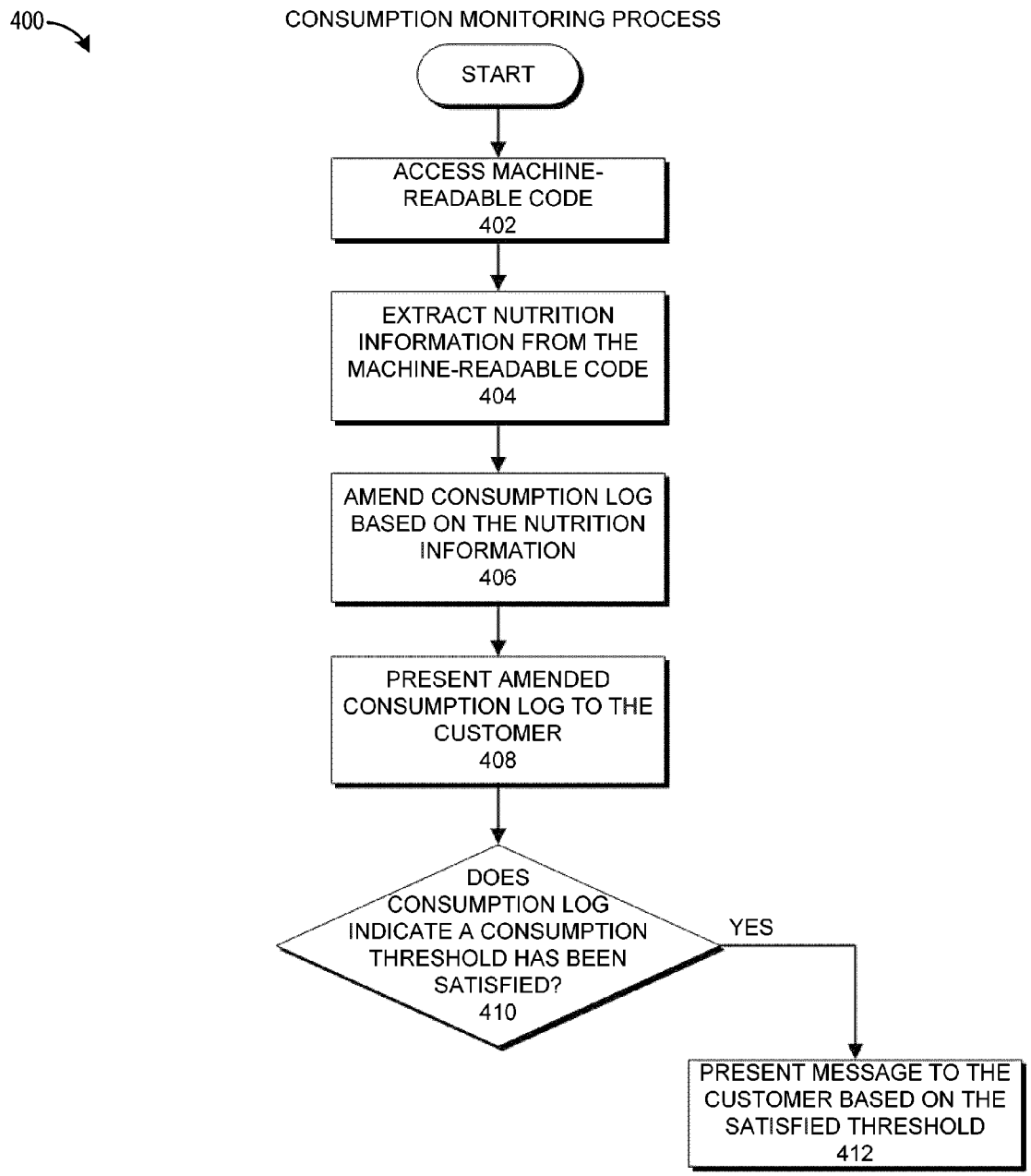
FIG. 4 illustrates a flow diagram for one embodiment of a consumption monitoring process.

FIG. 4 illustrates a flow diagram for one embodiment of a consumption monitoring process 400. The process 400 can be implemented by any system that can monitor the purchase or consumption of products on behalf of a customer 106 for a predefined time period (e.g. a day or a week) or event (e.g. a shopping trip or a vacation time period). For example, the process 400, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 400, to simplify discussion, the process 400 will be described as being generally implemented by the consumption guide processor 114. Advantageously, in some embodiments, the process 400 can be used to help monitor the diet of babies in an effort to identity the source of an allergy or to determine if a child is being properly nourished.

The process 400 begins at block 402, where, for example, the consumption guide processor 114 accesses the machine-readable code 152 associated with the product 150. The machine-readable code 152 may be scanned once to indicate that the customer 106 purchased or consumed a unit or a serving of the product 150. Although not limited as such, a unit generally refers to a saleable unit of the product 150, such as a box, carton, or container. Further, although a unit may be equivalent to a serving, a unit may also include multiple servings. Alternatively, the customer 106 can cause the consumption guide processor 114 to access the machine-readable code 152 multiple times to identify the purchase or consumption of multiple units or servings of the product 150. Scanning the machine-readable code 152 can indicate the consumption of one unit or one serving of the product 150. In one embodiment, the consumption guide processor 114 can identify fractions of servings consumed by, for example, determining the orientation of the mobile computing system 110 (e.g. holding the mobile computing system 110 horizontal can indicate a half serving, and holding the mobile computing system 110 vertically can indicate a full serving). Alternatively, the customer 106 can specify the number of servings or fraction of a serving by typing on, speaking to, or pushing a button on the mobile computing system 110.

At block 404, as with block 204, the consumption guide processor 114 extracts nutrition information from the machine-readable code 152. At block 404, the consumption guide processor 114 amends a consumption log based on the nutrition information. In one embodiment, the consumption log is stored at the preferences and consumption repository 112. In one embodiment, amending the consumption log can comprise amending a running total of any predefined nutrition categories, such as fats, carbohydrates, sugars, vitamins, processed foods, whole grains, etc.

At block 408, the consumption guide processor 114 can cause the amended consumption log to be presented to the customer 106. In one embodiment, block 408 can be performed after each time the consumption log is amended or changed, or at the end of a pre-specified time (e.g. end of the day) or event (e.g. completion of shopping trip). In one embodiment, the customer 106 can undo the amendment to the consumption log by, for example, re-accessing the machine-readable code or specifying using the mobile computing system 110 that the consumption log should be altered to remove the amendment or to adjust the amendment. Advantageously, in certain embodiments, the ability to alter or undo the amendment enables the customer 106 to indicate if the customer 106 consumed less than a full serving, or if the customer 106 opted not to purchase or consume the product 150 after observing the impact on the consumption log. In one embodiment, the customer 106 can confirm each amendment to the consumption log thereby enabling the customer 106 to alter serving counts or to change his or her mind about purchasing or consuming the product 150.

At decision block 410, the consumption guide processor 114 can determine whether a pre-specified consumption or purchase threshold has been satisfied based on the amended consumption log. In one embodiment, the threshold can be associated with one or more customer nutrition preferences, such as total fat count or amount of carbohydrates. In one embodiment, the threshold can be associated with a time period (e.g. an amount of vitamin C over a two-day period) or an event (e.g. an amount of processed sugar or corn syrup during a shopping trip). In one embodiment, the threshold can be associated with a maximum value (e.g. a maximum amount of sodium over the course of a day) or a minimum value (e.g. a minimum amount of iron over the course of a day).

Further, the threshold can be associated with a range. For example, there may be a minimum threshold associated with a daily minimum calcium requirement or preference and a maximum threshold associated with an excessive level of calcium. In one embodiment, the threshold can be multi-tier. For example, there could be a first warning threshold when the daily level of sodium reaches or exceeds 75% of a daily recommended amount or a pre-specified amount, and a second warning threshold when the daily level of sodium reaches or exceeds 100% of a daily recommended amount or a pre-specified amount.

If the consumption guide processor 114 determines a pre-specified consumption or purchase threshold has been satisfied, the consumption guide processor 114 can cause a message to be presented to the customer 106 based on the specified threshold. In one embodiment, the message is dependent on the threshold. For example, the message may be a warning if the amount of saturated fat in a week exceeds a threshold. Alternatively, the message may be an indicator that a nutrition goal has been reached (e.g. the customer 106 satisfied an iron requirement or preference for the day).

Example Pharmaceutical Purchase Process

Figure 5:
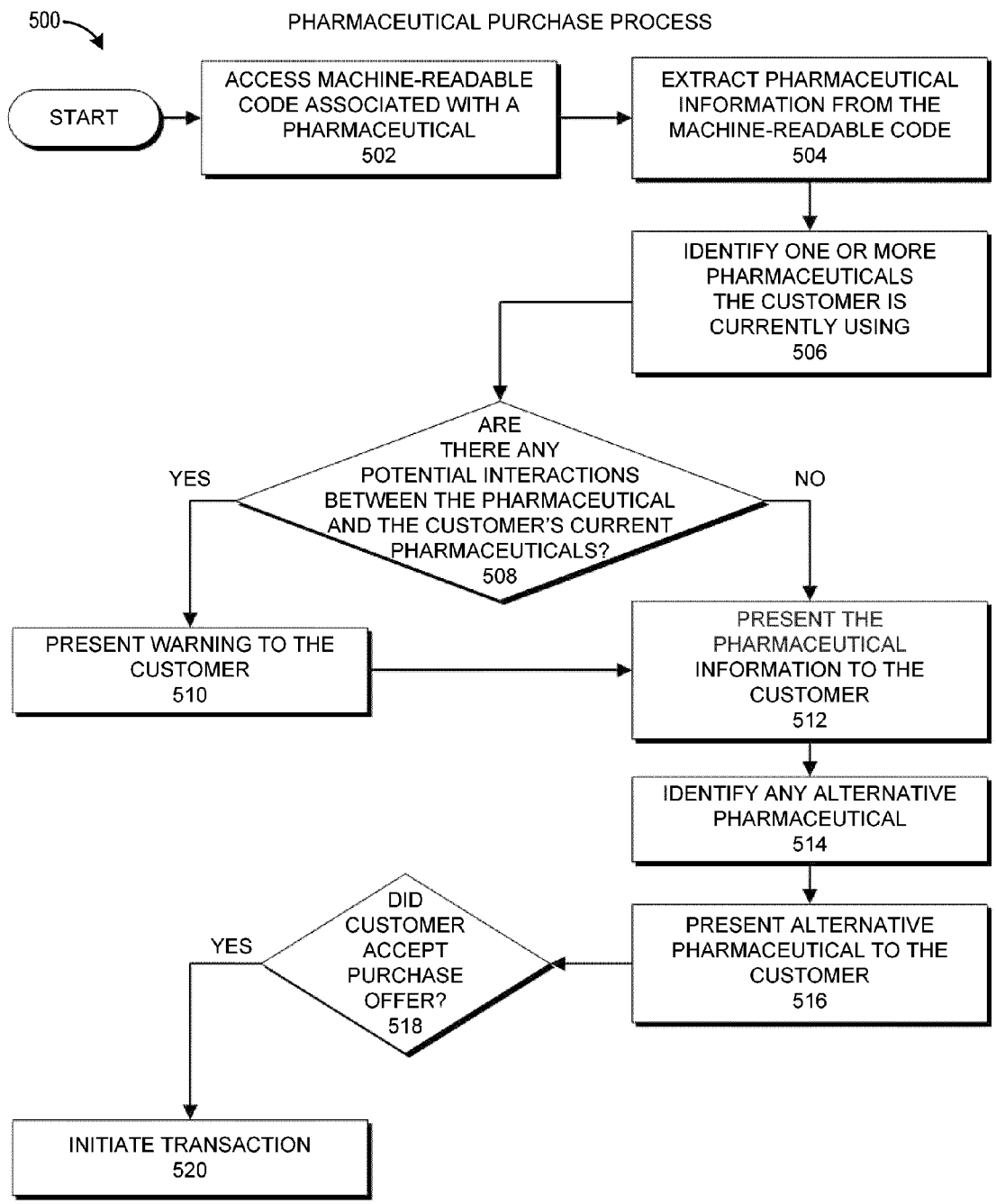
FIG. 5 illustrates a flow diagram for one embodiment of a pharmaceutical purchase process.

FIG. 5 illustrates a flow diagram for one embodiment of a pharmaceutical purchase process 500. The process 500 can be implemented by any system that can extract pharmaceutical information from, at least in part, a machine-readable code 152 and present it to a customer 106. For example, the process 500, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 500, to simplify discussion, the process 500 will be described as being generally implemented by the pharmaceutical use processor 156.

Advantageously, in some embodiments, the process 500 can be used to warn the customer 106 of any potential drug interactions between pharmaceuticals the customer 106 is currently taking and the product 150, which can represent a pharmaceutical the customer 106 is considering purchasing and/or consuming. In one embodiment, the product 150 can be any type of product that the customer 106 may take to maintain, improve or fortify the customer's 106 health, to manage a disease, or to relieve pain, including prescription and over-the-counter products. For ease of illustration, the systems and processes described herein are described in terms of pharmaceuticals. However, the systems and processes described therein can also be used with multi-vitamins, herbs, herbal mixtures, or other alternative or homeopathic medicines. Further, the product 150 can be any device, which may or may not include a pharmaceutical, for facilitating the customer 106 maintaining and monitoring the customer's 106 health. For example, the product 150 may be a glucose meter or an asthma inhaler.

The process 500 begins at block 502, where, for example, the pharmaceutical use processor 156 accesses a machine-readable code 152 associated with a pharmaceutical (e.g. the product 150). At block 504, the pharmaceutical use processor 156 extracts pharmaceutical information from the machine-readable code 152. This pharmaceutical information can include any information associated with pharmaceuticals as described above with respect to FIG. 1. In one embodiment, the pharmaceutical use processor 156 can optionally supplement the pharmaceutical information with information obtained from sources alternative to the machine-readable code 152, such as the interactive computing system 198, the doctor's office 190, a source associated with the product's 150 manufacturer, or a government database.

At block 506, the pharmaceutical use processor 156 identifies one or more pharmaceuticals that the customer 106 is currently using. In one embodiment, the pharmaceutical use processor 156 can also identify pharmaceuticals that the customer 106 plans to use (e.g. a pharmaceutical the customer 106 has recently purchased or for which the customer 106 has recently acquired a prescription) or has recently ceased using. In one embodiment, the pharmaceutical use processor 156 identifies the one or more pharmaceuticals by accessing the pharmaceutical use repository 154, which can store pharmaceutical information associated with the one or more pharmaceuticals.

At decision block 508, the pharmaceutical use processor 154 determines if there are any potential interactions between the product 150 and the one or more pharmaceuticals the customer 106 is currently using. In one embodiment, the pharmaceutical use processor 154 can determine if there exists any potential pharmaceutical interactions based on any source, such as one or more of the following: pharmaceutical information associated with the product 150, pharmaceutical information based on the one or more pharmaceuticals the customer 106 is currently using, information obtain from the doctor's office 190, information obtained from the interactive computing system 198, and information obtained from a government organization, to name a few. Determining if there exists any potential pharmaceutical interactions can include determining if there exists a threshold probability of any potential pharmaceutical or drug interactions between the product 150 and the one or more pharmaceuticals the customer 106 is currently taking.

If the pharmaceutical use processor 156 identifies any potential pharmaceutical interactions, the pharmaceutical use processor 156 can cause a warning to be presented to the customer 106 informing the customer 106 of the potential pharmaceutical interactions at block 510. In one embodiment, the warning can include one or more of the following: an identification of the one or more pharmaceuticals associated with the interaction, the effects of the potential interaction, the source of the information used to identity the interaction, and the probability of the potential interaction occurring. In one embodiment, the warning may also include identification of steps, if any, the customer 106 can take to reduce the chance of the potential interaction occurring.

In one embodiment, block 510 can also comprise contacting a healthcare provider (e.g. the doctor's office 190) associated with the customer 106. In some embodiments, the pharmaceutical use processor 156 can present the warning to the healthcare provider. In some embodiments, the pharmaceutical use processor 156 may receive one or more of the following: medical instructions, medical advice, a medical opinion, the identification of an alternative pharmaceutical from the healthcare provider, and a prescription for the alternative pharmaceutical. In some embodiments, the instructions, advice, medical opinion, identification of the alternative pharmaceutical, and/or prescription can be presented to the customer 106. In one embodiment, blocks 506, 508, and 510 are optional. In one embodiment, process 500 may end after block 510 is performed. Alternatively, the process 500 may further comprise presenting additional information to the customer 106 and/or identifying any potential alternative pharmaceuticals as will now be described.

If no potential interactions are identified, or if the process 500 does not end at block 510, the pharmaceutical use processor 156 causes the pharmaceutical information associated with the product 150 to be presented to the customer 106 at block 512. In one embodiment, block 512 can further comprise translating the pharmaceutical information from a machine-readable format into a human-readable format and presenting the human-readable format to the customer 106.

In one embodiment, block 512 can further comprise converting one or more pieces of complex nutrition information into a simpler form, such as converting the scientific name of an ingredient, to a layman's term or a more recognizable brand name, and/or identifying the purpose of the ingredient (e.g. an anti-inflammatory, a preservative, or an ingredient added for flavor).

At block 514, the pharmaceutical use processor 156 can identify any potential alternative pharmaceutical. In one embodiment, the pharmaceutical use processor 156 identifies the potential alternative pharmaceutical based on, for example, one or more of the following: the pharmaceutical information; the price of the product 150; pharmaceutical information associated with any other pharmaceuticals identified at block 506; symptoms associated with the customer 106; and the purpose for which the customer 106 was considering purchasing the product 150 (e.g. the customer's 106 medical condition). One or more of the above pieces of information may be obtained from one or more of the following sources: the machine-readable code 152, the customer 106, the doctor's office 190, the interactive computing system 198, the pharmaceutical use repository 154, and a source associated with a government or medical research organization.

In one embodiment, the alternative pharmaceutical is identical to the product 150, but is provided by an alternative source (e.g. an organization associated with the interactive computing system 198) and may have a different price than offered by the shopping environment 102. In one embodiment, the alternative pharmaceutical is a generic version of the product 150, or a brand-name version of the product 150.

In one embodiment, block 514 may further comprise obtaining pre-approval from a healthcare provider to substitute the alternative pharmaceutical for the product 150. In one embodiment, block 514 may further comprise obtaining pre-approval from an insurance provider to substitute the alternative pharmaceutical for the product 150.

At block 516, the pharmaceutical use processor 156 causes the identity of the alternative pharmaceutical to be presented to the customer 106. In one embodiment, block 516 can further include presenting pharmaceutical information associated with the alternative pharmaceutical to the customer 106. Further, block 516 can include presenting a purchase offer to the customer 106 associated with the interactive computing system 198. In one embodiment, the pharmaceutical use processor 156 can initiate a transaction for the alternative pharmaceutical in response to the customer's 106 indication of a desire to purchase the alternative pharmaceutical. Initiating the transaction can comprise interacting with the customer's 106 insurance company. In one embodiment, blocks 514 and 516 are optional.

At decision block 518, the pharmaceutical use processor 156 determines if the customer 106 accepted a purchase offer associated with the alternative pharmaceutical. This purchase offer can be presented to the customer 106 as part of block 516. If the customer 106 accepted the purchase offer, the pharmaceutical use processor 156 can initiate a transaction to purchase the alternative pharmaceutical at block 520. The pharmaceutical use processor 156 can initiate this transaction with the interactive computing system 198 or any other identified source of the alternative pharmaceutical. In one embodiment, blocks 518 and 520 are optional.

In one embodiment, the pharmaceutical use processor 156 can provide the pharmaceutical information to the doctor's office 190 to determine whether the customer's 106 healthcare provider approves of the customer 106 using the pharmaceutical or has any medical advice to provide the customer 106 relating to the pharmaceutical. Advantageously, in some embodiments, enabling the customer 106 to provide pharmaceutical information to the customer's 106 healthcare provider in advance of the customer 106 taking the pharmaceutical reduces the probability of complications or negative side-effects associated with the customer 106 using the pharmaceutical.

Example Pharmaceutical Use Reminder Process

Figure 6:
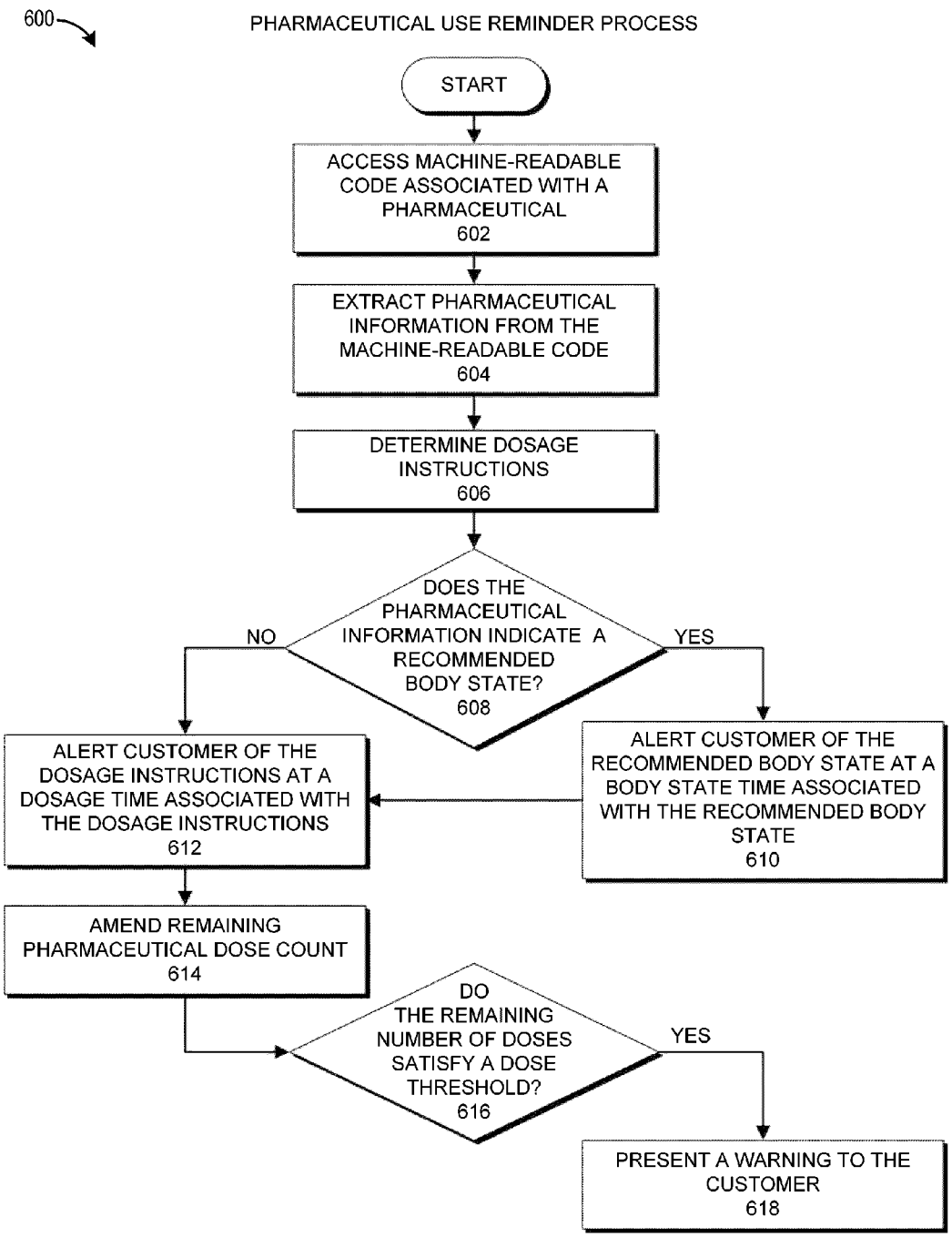
FIG. 6 illustrates a flow diagram for one embodiment of a pharmaceutical use reminder process.

FIG. 6 illustrates a flow diagram for one embodiment of a pharmaceutical use reminder process 600. The process 600 can be implemented by any system that can monitor the consumption of pharmaceuticals and remind the customer 106 when it is time to take a dose of the pharmaceutical and when it is time to purchase a resupply of the pharmaceutical. For example, the process 600, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 600, to simplify discussion, the process 600 will be described as being generally implemented by the pharmaceutical use processor 156.

The process 600 begins at block 602, where, for example, the pharmaceutical use processor 156 accesses a machine-readable code 152 associated with a pharmaceutical (e.g. the product 150). At block 604, the pharmaceutical use processor 156 extracts pharmaceutical information from the machine-readable code 152.

At block 606, the pharmaceutical use processor 156 determines dosage instructions based, at least in part, on the pharmaceutical information. The dosage instructions can include any information that can facilitate taking a dose of the product 150 including an identification of when to take a dose of the pharmaceutical, and how much of the pharmaceutical to take with each dose. In one embodiment, the dosage instructions can be based in part on the customer's 106 medical classification (e.g. the customer's 106 age, gender, body size, or body type, to name a few). This medical classification may be exact or an approximation and can be obtained from the customer 106, the doctor's office 190, or any other source of medical, physical, or biological information associated with the customer 106. In one embodiment, blocks 602, 604, and 606 are optional. In one embodiment, the process 600 can begin with the customer 106 providing the dosage instructions to the pharmaceutical use processor 156, including any indication of required or recommended body state for taking a dose of the pharmaceutical.

At decision block 608, the pharmaceutical use processor 156 determines if there is a recommended body state for taking a dose of the pharmaceutical based, at least in part, on the pharmaceutical information. The recommended body state refers to the recommended body condition under which the customer 106 is advised to take a dose of the pharmaceutical. For example the body state can include: on an empty stomach, on a full stomach, with water, with food, an hour after eating, or 30-minutes before sleeping, to name a few. In one embodiment, the pharmaceutical use processor 156 can store one or more of the dosage instructions and the recommended body state at the pharmaceutical use repository 154.

If a recommended body state exists, the pharmaceutical use processor 154 alerts the customer 106 of the recommended body state at a body state time associated with the recommended body state at block 610. For example, if the recommended body state is on a full stomach, the body state time (or pre-dosage time) may be 30-minutes or an hour prior to a dosage time associated with the dosage instructions. The dosage time indicates when the customer 106 is scheduled to take the customer's 106 next dose of the product 150. In one embodiment, the customer 106 can adjust the body state time. For example, the customer 106 may desire to advance the body state time to provide the customer 106 with more time to obtain food to take with the pharmaceutical. In one embodiment, one or more of the block 608 and 610 are optional.

At block 612, the pharmaceutical use processor 154 alerts the customer 106 of the dosage instructions at a dosage time. In one embodiment, the body state time and the dosage time may be equivalent. For example, the dosage instructions may indicate to take a dose of the pharmaceutical with a glass of water, which generally does not require advance notice. However, in this example, if the customer 106 does desire advance notice of the glass of water recommendation, the customer 106 can advance the body state time.

At block 614, for each dose the customer 106 consumes of the product 150, the pharmaceutical use processor 156 amends the remaining pharmaceutical dose count to reflect the consumed dose. In one embodiment, the pharmaceutical use processor 156 determines the total pharmaceutical dose count from the pharmaceutical information. In one embodiment, the pharmaceutical use processor 156 amends the remaining pharmaceutical dose count automatically at each dosage time. Alternatively, the pharmaceutical use processor 156 awaits confirmation from the customer 106 that the dose was in fact consumed. In one embodiment, the customer 106 can indicate that the dose was consumed by interacting with the mobile computing system 110 or by using the mobile computing system 110 to re-access or rescan the machine-readable code 152. In one embodiment, the remaining pharmaceutical dose count is stored at the pharmaceutical use repository 154.

In one embodiment, the remaining pharmaceutical dose count refers to a remaining number of uses of the product 150. For example, if the product 150 is a glucose meter, the pharmaceutical dose count may refer to the number of disposable test strips remaining. As a second example, if the product 150 is an asthma inhaler, the pharmaceutical dose count may refer to the number of actuations (or puffs) remaining.

At decision block 616, the pharmaceutical use processor 156 determines if the remaining number of doses of the product 150 satisfies a dose threshold. The dose threshold is associated with the number of total doses of the product 150. In one embodiment, the dose threshold may be zero, which indicates that the product 150 is completely exhausted. Alternatively, the dose threshold may be non-zero and may be pre-specified to provide the customer 106 with time to obtain a resupply of the product 150 before the customer's 106 existing supply of the product 150 is exhausted.

If the pharmaceutical use processor 156 determines that the remaining number of doses of the product 150 satisfies a dose threshold, the pharmaceutical use processor 156 can cause a warning to be presented to the customer 106. In one embodiment, the pharmaceutical use processor 156 can optionally initiate a transaction with, for example, the interactive computing system 198 to purchase a resupply of the product 150. In one embodiment, the pharmaceutical use processor 156 can automatically initiate and complete the transaction for the resupply of the product 150 without any interaction from the customer 106. In one embodiment, the pharmaceutical use processor 156 awaits confirmation from the customer 106 before initiating and/or completing the transaction for ordering the resupply of the product 150.

Advantageously, in some embodiments, using the pharmaceutical use processor 156 and process 500 to monitor the number of doses of the product 150 consumed helps to ensure that the customer 106 does not unexpectedly exhaust the supply of the product 106. This is particularly useful for products that are difficult to manually monitor, such as some asthma inhalers which do not include dose counters.

Example Environmentally Conscious Purchase Transaction Process

Figure 7:
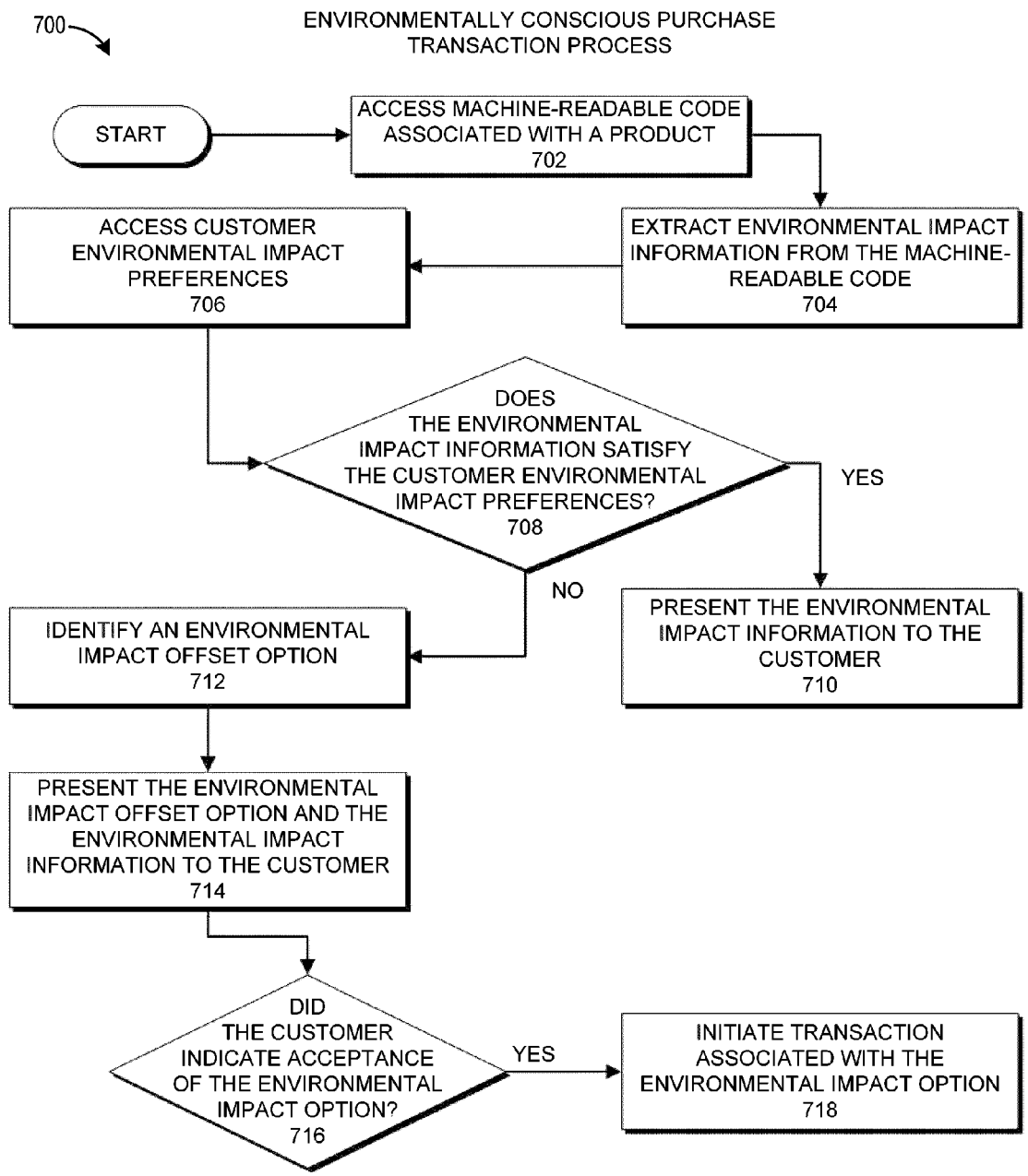
FIG. 7 illustrates a flow diagram for one embodiment of an environmentally conscious purchase transaction process.

FIG. 7 illustrates a flow diagram for one embodiment of an environmentally conscious purchase transaction process 700. The process 700 can be implemented by any system that can extract environmental impact information from, at least in part, a machine-readable code 152 and present it to a customer 106. For example, the process 700, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 700, to simplify discussion, the process 700 will be described as being generally implemented by the consumption guide processor 114. In one embodiment, the machine-readable code 152 is associated with the product 150, which can represent any type of product that has an impact on the environment through its manufacture, distribution, use, or disposal. For example, the product 150 can be a food item, an electronic device, an electric device, a wooden item, or a beauty product, to name a few.

The process 700 begins at block 702, where, for example, the consumption guide processor 114 accesses the machine-readable code 152 associated with a product 150. At block 704, the consumption guide processor 114 extracts environmental impact information from the machine-readable code 152. This environmental impact information can include any information associated with manufacturing, distributing, using, or disposing of the product 150 as described above with respect to FIG. 1. In one embodiment, the consumption guide processor 114 can optionally supplement the environmental impact information with information obtained from sources alternative to the machine-readable code 152, such as the interactive computing system 198, a source associated with the product's 150 manufacturer, or a government database.

At block 706, the consumption guide processor 114 accesses customer environmental impact preferences associated with the customer 106 and stored at, for example, the preferences and consumption repository 112. The customer environmental impact preferences can include any preferences related to the customer's 106 purchase of the product 150 as described above with respect to FIG. 1. In one embodiment, the customer environmental impact preferences can include different preferences for different types of products. For example, the customer 106 may have a preference that some or all food items be manufactured or produced from within a 100-mile radius. As another example, the customer 106 may have a preference that the manufacture and/or use of an appliance consume less than a threshold level of electricity.

In one embodiment, the customer environmental impact preferences are pre-specified by the customer 106. Alternatively, or additionally, the customer environmental impact preferences can be pre-specified by a third-party source, such as an organization advocating a preference for the consumption of locally produced products, or an organization advocating reducing a person's carbon footprint.

At decision block 708, the consumption guide processor 114 determines if the environmental impact information (and therefore the product 150) satisfies the customer environmental impact preferences. In one embodiment, the determination can be per preference category. For example, the consumption guide processor 114 can determine if the amount of electricity required to manufacture, to distribute, to use, and to dispose of a television is above a corresponding threshold. For example, the customer 106 may specify as part of the customer preferences a desire to not purchase electronics with toxic materials that are harmful to the environment. However, the customer 106 may further specify that a product with toxic materials may still be desirable if the manufacturer has a program in place that enables the reuse of at least a threshold percentage of the toxic materials thereby preventing the release of the toxic materials into the water supply. As a second example, the customer 106 may specify a desire to not purchase a refrigerator that uses more than a threshold amount of electricity over the estimated lifetime of the refrigerator. Thus, in this second example, the consumption guide processor 114 examines the reported amount of electricity required to manufacture, distribute, use, and dispose of the refrigerator to determine if the threshold is satisfied as part of the determination at decision block 708.

If the consumption guide processor 114 determines that the environmental impact information satisfies the customer environmental impact preferences, the consumption guide processor 114 causes the environmental impact information to be presented to the customer at block 710. In one embodiment, presenting the environmental impact information can include presenting the environmental impact information in any manner that can facilitate the customer 106 quickly determining how the product 150 compares to the customer's 106 environmental impact preferences. For example, the environmental impact information can be presented as a chart, as a series of percentage values, or as an image of a foot that may differ in size and/or color depending based on the environmental impact of the product 150, to name a few. In one embodiment, presenting the environmental impact information to the customer 106 further comprises translating the environmental impact information accessed from the machine-readable code 152 into a human-readable format and presenting the human-readable environmental impact information to the customer 106.

If the consumption guide processor 114 determines that the environmental impact information does not satisfy the customer environmental impact preferences, the consumption guide processor 114 can identify an environmental impact offset option at block 712. In one embodiment, the environmental impact offset option can be based on one or more of the customer environmental impact preferences, the product 150, and the environmental impact information. For example, if the product 150 includes more than a threshold level of toxic chemicals, the customer environmental impact preferences may indicate that no environmental impact offset option is acceptable to the customer 106. As a second example, assuming the product 150 is a car, the customer environmental impact preferences may indicate the customer 106 is unwilling to consider the car if the miles per gallon (mpg) estimate is below a first threshold, but may consider an environmental impact offset option if the car's mpg estimate is between the first threshold and a second threshold.

In one embodiment, the environmental impact offset options can include one or more of the following: a one-time offset, a monthly offset, and a combination of the one-time offset and the monthly offset.

In one embodiment, the customer environmental impact preferences may specify the environmental impact offset options the customer 106 is willing to consider. In one embodiment, the consumption guide processor 114 can identify environmental impact offset options from the environmental offsets provider 196 or the interactive computing system 198. In one embodiment, block 712 can further comprise identifying an alternative product that satisfies the customer environmental impact preferences or more closely satisfies the customer environmental impact preferences compared to the product 150. Identifying an alternative product is discussed in more detail with respect to FIG. 8.

At block 714, the consumption guide processor 114 causes one or more environmental impact offset options and the environmental impact information to be presented to the customer 106. In one embodiment, presenting the environmental impact information is as described with respect to block 710. In one embodiment, presenting the one or more environmental impact offset options can include presenting the one or more environmental impact offset options in any manner that can facilitate the customer 106 quickly determining how the one or more environmental impact offset options can reduce the environmental impact of the product 150. For example, the effect of the one or more environmental impact offset options can be illustrated via a multi-colored bar graph. In one embodiment, blocks 712 and 714 are optional. In one embodiment, presenting the one or more environmental impact offset options includes presenting a price associated with the one or more environmental impact offset options. In one embodiment, presenting the one or more environmental impact offset options includes presenting a total price calculated based on the price of the product 150 and the price of the one or more environmental impact offset options.

In one embodiment, if the customer 106 indicates a desire to purchase one or more of the environmental impact offset options, the consumption guide processor 114 can initiate a transaction with the environmental offsets provider 196 or the interactive computing system 198 to purchase the one or more environmental offset options.

At decision block 716, the consumption guide processor 114 determines whether the customer 106 indicated acceptance of a purchase offer associated with the environmental impact offset option. This purchase offer can be presented to the customer 106 as part of block 714. If the customer 106 accepted the purchase offer, the consumption guide processor 116 can initiate a transaction to purchase the environmental impact offset option at block 718. The consumption guide processor 114 can initiate this transaction with the interactive computing system 198, the environmental offsets provider 196, or any other identified source of the environmental offset option. In one embodiment, blocks 716 and 718 are optional.

In one embodiment, the process 700 can be used to compare the environmental impact of multiple products. For example, after the consumption guide processor 114 performs the process 700 for the product 150, the consumption guide processor 114 can store the environmental impact information and the environmental impact offset options, if any, at the preferences and consumption repository 112. Upon scanning a machine-readable code associated with an alternative product, the consumption guide processor 114 can perform the process 700 with respect to the alternative product. The consumption guide processor 114 can access the environmental impact information and the environmental impact offset options associated with the product 150 and compare them to the environmental impact information and the environmental impact offset options associated with the alternative product. This comparison information can be presented to the customer 106 and/or stored at the preferences and consumption repository 112 for additional comparisons or later reference.

Example Environmentally Conscious Alternative Product Transaction Process

Figure 8:
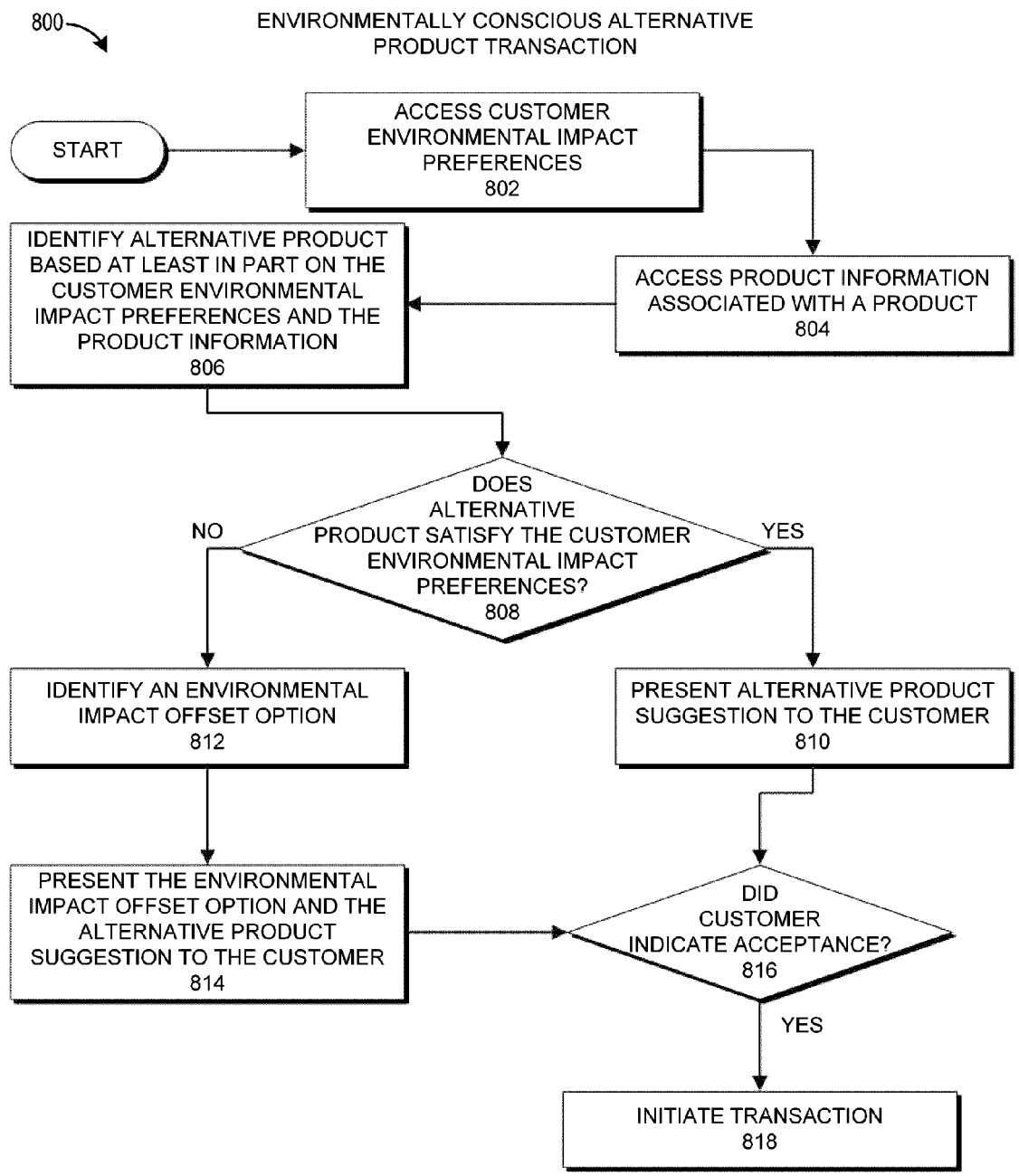
FIG. 8 illustrates a flow diagram for one embodiment of an environmentally conscious alternative product transaction process.

FIG. 8 illustrates a flow diagram for one embodiment of an environmentally conscious alternative product transaction process 800. The process 800 can be implemented by any system that can access customer environmental impact preferences and can identify an alternative for the product 150 based, at least in part, on the customer environmental impact preferences. For example, the process 800, in whole or in part, can be implemented by the mobile computing system 110, the machine-readable code interface 116, the interactive computing system 198, the consumption guide processor 114, and the pharmaceutical use processor 156, to name a few. Although any number of systems, in whole or in part, can implement the process 800, to simplify discussion, the process 800 will be described as being generally implemented by the consumption guide processor 114.

The process 800 begins at block 802, where, for example, the consumption guide processor 114 accesses customer environmental impact preferences as described above with respect to block 706. At block 804, the consumption guide processor 114 accesses product information associated with the product 150. The product information can include any product metadata. For example, the product information can include the product: type, name, model, style, ratings, features, location of origin etc. In one embodiment, the product information can be identified from one or more of the following sources: the machine-readable code 152, the interactive computing system 198, the product's 150 manufacturer, shopping environment 102, a product review organization, or any other third-party source that can provide access to product information.

At block 806, the consumption guide processor 114 identifies an alternative product based, at least in part, on the customer environmental impact preferences and the product information. In one embodiment, the consumption guide processor provides the customer environmental impact preferences and the product information to the interactive computing environment 198. In one embodiment, the consumption guide processor 114 can use the interactive computing system 198 to obtain the identity of an alternative product.

In one embodiment, as described with reference to FIG. 3, identifying an alternative product can include identifying one or more products that share one or more attributes with the product 150. Further, the one or more alternative products can be ranked based, at least in part, on how closely the alternative products satisfy the customer's 106 environmental impact preferences. The attributes can include any product characteristics associated with the environmental impact of the product. For example, the attributes can include the amount of electricity required to produce and/or operate the product, the amount of $CO_2$ expended in producing or using the product, or the amount of recyclable materials used in producing the product, to name a few. In one embodiment, the interactive computing system 198 determines the alternative products based on attributes associated with the product 150. The consumption guide processor 114 can provide the attributes to the interactive computing system 198, or the interactive computing system 198 can determines the attributes based on the identity of the product 150.

At decision block 808, the consumption guide processor 114 determines if the alternative product satisfies the customer environmental impact preferences. In one embodiment, decision block 808 further comprises comparing at least a subset of the product information associated with the alternative product to corresponding information with the product 150 to obtain a product comparison. For example, the consumption guide processor 114 can compare the product features and the product ratings to obtain the product comparison.

If the consumption guide processor 114 determines that the alternative product satisfies the customer environmental impact preferences, the consumption guide processor 114 causes the alternative product suggestion to be presented to the customer 106 at block 810. In one embodiment, presenting the alternative product suggestion includes presenting a price associated with the alternative product. In one embodiment, block 810 further comprises presenting the product comparison to the customer 106. In one embodiment, block 810 further comprises presenting a purchase offer associated with the alternative product to the customer 106. If the customer 106 accepts the product offer, the consumption guide processor 114 can initiate a transaction with, for example, the interactive computing system 198, to purchase the alternative product.

If the consumption guide processor 114 determines that the alternative product does not satisfy the customer environmental impact preferences, at block 812 the consumption guide processor 114 can identify an environmental impact offset option as described above with respect to block 712. In one embodiment, the alternative product satisfies more of the customer environmental impact preferences than does the product 150. In one embodiment, the alternative product is closer than the product 150 to satisfying the customer environmental impact preferences. Advantageously, in some embodiments, because the alternative product is closer than the product 150 to satisfying the customer environmental impact preferences, the customer 106 can reduce the customer's 106 environmental footprint regardless of whether the alternative product satisfies the customer environmental impact preferences.

At block 814, the consumption guide processor 114 causes the environmental impact offset option and the alternative product suggestion to be presented to the customer 106. In one embodiment, presenting the alternative product suggestion is as described with respect to block 810. In one embodiment, presenting the environmental impact offset option is as described with respect to block 714. In one embodiment, presenting the environmental impact offset option and the alternative product suggestion includes presenting a total price calculated based on the price of the alternative product and the price of the environmental impact offset option. In one embodiment, blocks 812 and 814 are optional.

At decision block 816, the consumption guide processor 114 determines whether the customer 106 indicated acceptance of a purchase offer for one or more of the alternative product and the environmental impact offset option. This purchase offer can be presented to the customer 106 as part of block 810 or 814. If the customer 106 accepted the purchase offer, the consumption guide processor 114 can initiate a transaction to purchase one or more of the alternative product and the environmental impact offset option at block 818. The consumption guide processor 114 can initiate this transaction with the interactive computing system 198, the environmental offsets provider 196, or any other identified source of the alternative product or environmental impact offset option. In one embodiment, blocks 816 and 818 are optional.

Additional Terminology

A number of computing systems have been described throughout this disclosure. The descriptions of these systems are not intended to limit the teachings or applicability of this disclosure. For example, the mobile computing systems described herein can generally include any mobile computing device(s), such as smart phones, PDAs, tablets, or the like. Further, it is possible for the mobile computing systems described herein to be different types of devices, to include different applications, or to otherwise be configured differently. In addition, the mobile computing systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 3, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. Non-transitory physical computer storage comprising computer-executable instructions for implementing a method of maintaining environmental impact preferences, the method comprising:
    accessing a machine-readable code scanned by a user;
    extracting the environmental impact information associated with a product from the machine-readable code;
    programmatically determining a product category of the product from the environmental impact information;
    accessing environmental impact preferences associated with the user for the product category, wherein the environmental impact preferences differ based on the product category;
    determining whether the environmental impact information satisfies the environmental impact preferences for the product category; and
    presenting a result of the determination to the user.

2. The non-transitory physical computer storage of claim 1, wherein the method further comprises:
    translating the environmental impact information into a human-readable format to obtain translated environmental impact information; and
    presenting the translated environmental impact information to the user.

3. The non-transitory physical computer storage of claim 1, wherein the environmental impact information is associated with one or more of the following: use of the product, manufacture of the product, transportation of the product, and disposal of the product.

4. The non-transitory physical computer storage of claim 1, wherein the method further comprises:
    in response to determining that the environmental impact information does not satisfy the environmental impact preferences, identifying an environmental offset option; and
    presenting the environmental offset option to the user.

5. The non-transitory physical computer storage of claim 4, wherein the method further comprises initiating a transaction to purchase the environmental offset option.

6. The non-transitory physical computer storage of claim 4, wherein the environmental offset option can include one or more of the following: a one-time offset, a monthly offset, and a combination of the one-time offset and the monthly offset.

7. The non-transitory physical computer storage of claim 4, wherein the method further comprises:
    calculating a total product price based on a product price associated with the product and an offset price associated with the environmental offset option;
    identifying an alternative product price associated with a cost of an alternative product; and
    presenting the total product price and the alternative product price to the user.

8. The non-transitory physical computer storage of claim 1, wherein the method further comprises:
    identifying an alternative product that satisfies the environmental impact preferences; and
    presenting an identity of the alternative product to the user.

9. The non-transitory physical computer storage of claim 8, in combination with a computer system comprising one or more computing devices.

10. The non-transitory physical computer storage of claim 8, wherein identifying the alternative product is based on one or more of the following: the environmental impact preferences; the alternative product's price; the alternative product's quality; user ratings; the alternative product's features; brand name; the alternative product's specifications; and the alternative product's environmental impact.

11. The non-transitory physical computer storage of claim 1, wherein the method further comprises storing the environmental impact information.

12. The non-transitory physical computer storage of claim 1, wherein the method further comprises:
    accessing a second machine-readable code associated with a second product;
    extracting a second environmental impact information associated with the second product from the second machine-readable code;
    comparing the second environmental impact information with the environmental impact information; and
    presenting a result of the comparison to the user.

13. A system for maintaining environmental impact preferences, the system comprising:
 a consumption guide processor comprising computer hardware, the consumption guide processor configured to:
  access a machine-readable code associated with a product;
  programmatically extract environmental impact information associated with the product from the machine-readable code;
  determine a product category of the product from the environmental impact information;
  access environmental impact preferences associated with a user for the product category, wherein the environmental impact preferences differ based on the product category;
  determine whether the environmental impact information satisfies the environmental impact preferences for the product category; and
  present a result of the determination to the user.

14. The system of claim 13, wherein the consumption guide processor is further configured to:
 translate the environmental impact information into a human-readable format to obtain translated environmental impact information; and
 present the translated environmental impact information to the user.

15. The system of claim 13, wherein the consumption guide processor is further configured to:
 identify an environmental offset option in response to determining that the environmental impact information does not satisfy the environmental impact preferences; and
 present the environmental offset option to the user.

16. The system of claim 15, wherein the consumption guide processor is further configured to:
 calculate a total product price based on a product price associated with the product and an offset price associated with the environmental offset option;
 identify an alternative product price associated with a cost of an alternative product; and
 present the total product price and the alternative product price to the user.

17. The system of claim 13, wherein the consumption guide processor is further configured to:
 identify an alternative product that satisfies the environmental impact preferences; and
 present an identity of the alternative product to the user.

18. The system of claim 13, wherein the consumption guide processor is further configured to store the environmental impact information.

19. The system of claim 13, wherein the consumption guide processor is further configured to:
 access a second machine-readable code associated with a second product;
 extract a second environmental impact information associated with the second product from the second machine-readable code;
 compare the second environmental impact information with the environmental impact information; and
 present a result of the comparison to the user.

20. A method of maintaining environmental impact preferences, the method comprising:
 accessing a machine-readable code scanned by a user;
 obtaining environmental impact information about a product using the machine-readable code;
 programmatically determining a product category of the product from the environmental impact information;
 accessing environmental impact preferences associated with the user for the product category, wherein the environmental impact preferences differ based on the product category;
 determining, by one or more processors, whether the environmental impact information satisfies the environmental impact preferences for the product category; and
 presenting a result of the determination to the user.

21. The method of claim 20, further comprising:
 translating the environmental impact information into a human-readable format to obtain translated environmental impact information; and
 presenting the translated environmental impact information to the user.

22. The method of claim 20, wherein the environmental impact information is associated with one or more of the following: use of the product, manufacture of the product, transportation of the product, and disposal of the product.

23. The method of claim 20, wherein the machine-readable code is associated with a uniform resource locator (URL).

24. The method of claim 20, further comprising:
 in response to determining that the environmental impact information does not satisfy the environmental impact preferences, identifying an environmental offset option; and
 presenting the environmental offset option to the user.

25. The method of claim 24, further comprising initiating a transaction to purchase the environmental offset option.

26. The method of claim 24, wherein the environmental offset option can include one or more of the following: a one-time offset, a monthly offset, and a combination of the one-time offset and the monthly offset.

27. The method of claim 24, further comprising:
 calculating a total product price based on a product price associated with the product and an offset price associated with the environmental offset option;
 identifying an alternative product price associated with a cost of an alternative product; and
 presenting the total product price and the alternative product price to the user.

28. The method of claim 20, further comprising:
 identifying an alternative product that satisfies the environmental impact preferences; and
 presenting an identity of the alternative product to the user.

29. The method of claim 28, further comprising initiating a transaction to purchase the alternative product.

30. The method of claim 28, wherein identifying the alternative product is based on one or more of the following: the environmental impact preferences; the alternative product's price; the alternative product's quality; user ratings; the alternative product's features; brand name; the alternative product's specifications; and the alternative product's environmental impact.

31. The method of claim 20, further comprising storing the environmental impact information.

32. The method of claim 20, further comprising:
 accessing a second machine-readable code scanned by the user, the second machine-readable code being associated with a second product;
 obtaining second environmental impact information about the second product using the second machine-readable code;
 comparing the second environmental impact information with the environmental impact information; and
 presenting a result of the comparison to the user.

33. The method of claim 32, wherein the result comprises a recommendation to purchase the second product instead of the product.

34. The non-transitory physical computer storage of claim 1, wherein determining whether the environmental impact information satisfies the environmental impact preferences for the product category comprises:
 identifying a set of preference categories included in the environmental impact preferences; and
 for each preference category from the set of preference categories, evaluating whether corresponding environmental impact information from the environmental impact information satisfies a corresponding threshold.

35. The non-transitory physical computer storage of claim 34, wherein determining whether the environmental impact information satisfies the environmental impact preferences for the product category further comprises determining whether an aggregation of said evaluations satisfies the environmental impact preferences.

36. The non-transitory physical computer storage of claim 1, wherein the environmental impact information includes an identification of an offset program implemented by a manufacturer of the product.

37. The non-transitory physical computer storage of claim 1, wherein, in response to determining that the environmental impact information does not satisfy the environmental impact preferences for the product type, the method further comprises:
 determining whether the environmental impact information includes an identification of an offset program implemented by a manufacturer of the product; and
 in response to determining that the environmental impact information includes the identification of the offset program, determining whether the inclusion of the offset program is sufficient to satisfy the environmental impact preferences.

38. The non-transitory physical computer storage of claim 1, wherein extracting the environmental impact information associated with the product from the machine-readable code comprises extracting environmental impact information embedded in the machine-readable code.

39. The non-transitory physical computer storage of claim 1, in combination with one or more processors configured to implement the method.

\* \* \* \* \*